US011663911B2

(12) United States Patent
De Steuben et al.

(10) Patent No.: US 11,663,911 B2
(45) Date of Patent: *May 30, 2023

(54) SENSOR GAP ANALYSIS

(71) Applicant: Not A Satellite Labs, LLC, Tysons, VA (US)

(72) Inventors: Christopher R. De Steuben, Ashburn, VA (US); David R. Maxfield, Round Hill, VA (US); Walter E. Buchanan, Round Hill, VA (US); William L. Collins, Leesburg, VA (US)

(73) Assignee: Not A Satellite Labs, LLC, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,772

(22) Filed: Jun. 3, 2021

(65) Prior Publication Data

US 2022/0392340 A1 Dec. 8, 2022

(51) Int. Cl.
*G08G 1/0967* (2006.01)
*G08G 1/09* (2006.01)
*G08G 1/0968* (2006.01)

(52) U.S. Cl.
CPC ....... *G08G 1/096741* (2013.01); *G08G 1/094* (2013.01); *G08G 1/096805* (2013.01)

(58) Field of Classification Search
CPC .......... G05D 1/0287; G08G 1/096775; G06V 20/10; G06V 2201/10; H04N 1/00973; G07C 5/008
See application file for complete search history.

(56) References Cited

U.S. PATENT DOCUMENTS

| | | |
|---|---|---|
| 8,060,154 B1 | 11/2011 | Bali et al. |
| 8,290,704 B2 | 10/2012 | Bai et al. |
| 8,368,762 B1 | 2/2013 | Chen et al. |
| 8,717,361 B2 | 5/2014 | Sasakawa et al. |
| 8,731,823 B2 | 5/2014 | Schunder et al. |
| 8,994,822 B2 | 3/2015 | Smitherman et al. |
| 9,088,625 B1 | 7/2015 | Moczydlowski |
| 9,179,104 B2 | 11/2015 | Fan et al. |
| 9,417,312 B2 | 8/2016 | Velusamy |
| 9,456,123 B2 | 9/2016 | Emmett et al. |
| 9,509,867 B2 | 11/2016 | Camp et al. |
| 9,706,117 B2 | 7/2017 | Lapstun et al. |
| 9,798,928 B2 | 10/2017 | Carr et al. |
| 9,863,774 B2 | 1/2018 | Gonopolskiy et al. |
| 9,986,140 B2 | 5/2018 | Collins et al. |
| 10,042,863 B2 | 8/2018 | Zhu et al. |
| 10,304,343 B2 | 5/2019 | Mustafic et al. |
| 10,911,694 B2 | 2/2021 | Damstra et al. |
| 2011/0069179 A1 | 3/2011 | Bathiche et al. |
| 2013/0169806 A1 | 7/2013 | Wu et al. |

(Continued)

*Primary Examiner* — Mirza F Alam
(74) *Attorney, Agent, or Firm* — Bekiares Eliezer LLP

(57) ABSTRACT

Systems, methods, and computer readable media for performing task assignment, completion, and management within a crowdsourced surveillance platform. A remote server may identify targets for image capture and may assign capture tasks to users based on travel plans of the user. Users may be assigned task to capture image of target locations lying along a travel path. The remote server may aggregate data related to the captured images and use it to update a map and log changes to the target location over time.

20 Claims, 24 Drawing Sheets

(56) References Cited

U.S. PATENT DOCUMENTS

| | | |
|---|---|---|
| 2014/0253377 A1 | 9/2014 | Scalisi et al. |
| 2015/0022656 A1* | 1/2015 | Carr ..................... G06V 20/13 |
| | | 348/117 |
| 2015/0170386 A1 | 6/2015 | Chawathe et al. |
| 2016/0088266 A1 | 3/2016 | Du et al. |
| 2016/0116280 A1 | 4/2016 | Joyce et al. |
| 2016/0169692 A1 | 6/2016 | Gupta et al. |
| 2017/0085774 A1* | 3/2017 | Majumdar ......... H04N 5/23216 |
| 2018/0270427 A1* | 9/2018 | Damstra .......... H04N 21/23418 |
| 2019/0031346 A1 | 1/2019 | Yong et al. |
| 2019/0320113 A1* | 10/2019 | Rajvanshi .............. H04N 5/232 |
| 2020/0294401 A1* | 9/2020 | Kerecsen ............. G05D 1/0287 |

* cited by examiner

SENSOR GAP ANALYSIS

CROSS-REFERENCE TO RELATED APPLICATIONS

The present Application for Patent claims the benefit of: U.S. Non-Provisional Application Ser. No. 17/337,766, entitled "Crowdsourced Surveillance Platform", filed Jun. 3, 2021, U.S. Non-Provisional Application Ser. No. 17/337,829, entitled "Image modification for Crowdsourced Surveillance", filed Jun. 3, 2021, U.S. Non-Provisional Application Ser. No. 17/337,860, entitled "Path-Based Surveillance Image Capture", filed Jun. 3, 2021, U.S. Non-Provisional Application Ser. No. 17/337,777, entitled "Mobile Device Power Management in Surveillance Platform", filed Jun. 3, 2021, U.S. Non-Provisional Application Ser. No. 17/337,868, entitled "Correction of Surveillance Images", filed Jun. 3, 2021, the entirety of each of which is hereby expressly incorporated by reference herein in its entirety.

BACKGROUND

1. Field of the Disclosure

Embodiments relate to a crowdsourcing platform for enabling the capturing surveillance images using a mobile communication device that is in transit in or own a vehicle.

2. Description of the Related Art

The global mass adoption of consumer mobile communication devices (smart devices) has ushered in a new era of modern computing. The cheapest smart devices on the market come equipped with a variety of sensors and specialized software that provides for a powerful computing experience in a form factor that can be taken anywhere. Device manufacturers have pursued aggressive product development lifecycles, resulting in new consumer technology being delivered to market at a blistering pace.

With these advances, a broad category of products and services have emerged to fill unmet needs in mobile computing. Crowdsourcing leverages a network of computers, humans, or a combination thereof in order to accomplish a task or goal. New platforms have emerged that make use of crowdsourcing in a myriad of clever ways, like using a wide network of individuals to fund projects and initiatives or contribute to the world's knowledge base. However, crowdsourcing has not been used in the capture of diverse surveillance footage, due to the various challenges presented by such a platform.

Embodiments of the invention address these and other problems, individually and collectively.

BRIEF SUMMARY

Embodiments of the invention allow for the performance of crowdsourced surveillance by mobile communication devices, which capture images while in transit on or in a vehicle, and then transmit the images to a remote server for aggregation and updating. As long as the mobile communication device has an image sensor and a network interface, it can collect images of target locations and provide them to the crowdsourcing platform.

One embodiment of the invention is directed to a method including receiving, by a transceiver of a mobile communication device, a reference image and identifying, by a processor of the mobile communication device, location metadata within the reference image. The method includes determining that a vehicle within which the mobile communication device is located is within a first threshold distance of a location associated with the location metadata. Further, the method includes capturing, via an image sensor of the mobile communication device, an image in response to determining that the vehicle is within the first threshold distance of the location, and transmitting, via the transceiver, data associated with the captured image to a remote server.

Additional embodiments include a mobile communication device comprising a processor, an image sensor, a transceiver, and a computer readable medium or memory. The computer readable medium or memory comprises code, executable by the processor, configured or programmed to perform the above-noted method.

Another embodiment of the invention is directed to a method including determining, by a processor of a mobile communication device, a resolution characteristic of the image sensor based, at least in part on image sensor model data stored in the memory. The method includes transmitting, by a transceiver of the mobile communication device, an image sensor model and the resolution characteristic to a remote server, and receiving, by the transceiver, from the remote server, an image correction model, wherein the image correction model is selected based at last in part on the image sensor model and the resolution characteristic. The method also includes capturing, by an image sensor of the mobile communication device, an image while the mobile communication device is within a vehicle. The method further includes modifying, by the processor, the captured image using the image correction model.

Additional embodiments include a mobile communication device comprising a processor, an image sensor, a transceiver, and a computer readable medium or memory. The computer readable medium comprises code, executable by the processor, configured or programmed to perform the above-noted method.

Yet another embodiment of the invention is directed to a method including receiving, by a transceiver of a mobile communication device, from a remote server, a sensor status request identifying a sensor for which status is requested. The method includes polling, by the processor, the sensor to obtain a sensor status and determining, based on the sensor status whether the sensor is inadequate for capturing data associated with an in-transit image capture. The method also includes in response to determining that the sensor status is inadequate, transmitting, by the transceiver, to the remote server in a sensor status reply including that the sensor status is inadequate. Finally, the method includes receiving, by the transceiver from the remote server, substitute vehicle movement data, wherein the substitute vehicle movement data includes data about the movement of a vehicle in which the mobile communication device will be traveling.

Additional embodiments include a mobile communication device comprising a processor, an image sensor, a transceiver, and a computer readable medium or memory. The computer readable medium comprises code, executable by the processor, configured or programmed to perform the above-noted method.

Still another embodiment of the invention is directed to a method including transmitting, by a transceiver of a mobile communication device, to a remote server, travel path information associated with a vehicle in which the mobile communication device is scheduled to travel. The method includes receiving, by the transceiver, from the remote server, a reference image and session information, wherein the session information includes metadata from a capture session of the reference image, and wherein the received reference image is selected by the reference server and based, at least in part, on the travel path information. The method also includes monitoring, by a processor of the mobile communication device, a location of the mobile communication device as the vehicle moves along a travel path associated with the travel path information. The method further includes, initiating, via an image sensor of the mobile communication device, capture of an image when the mobile communication device is within a first threshold distance from a location indicated by the session information.

Additional embodiments include a mobile communication device comprising a processor, an image sensor, a transceiver, and a computer readable medium or memory. The computer readable medium comprises code, executable by the processor, configured or programmed to perform the above-noted method.

Another embodiment of the invention is directed to a method including receiving, by a transceiver of a mobile communication device, from a remote server, travel path information for a vehicle in which the mobile communication device will travel. The method includes receiving, by the transceiver, a reference image, and identifying location metadata within the reference image. The method includes calculating a travel distance until the vehicle reaches a location associated with the location metadata. Further, the method includes calculating, an estimate power resource requirement for the mobile communication device to continue operating until reaching the location associated with the location metadata and to capture an image. The method also includes determining, whether a current power reserve of the mobile communication device is greater than or equal to the calculated power resource, and adjusting, by a processor of the mobile communication device, current power consumption by the mobile communication device in response to determining that current the power reserve is less than the power resource requirement.

Additional embodiments include a mobile communication device comprising a processor, an image sensor, a transceiver, and a computer readable medium or memory. The computer readable medium comprises code, executable by the processor, configured or programmed to perform the above-noted method.

Yet another embodiment of the invention is directed to a method including receiving, by a transceiver of a mobile communication device, from the remote server, a reference image and session information, wherein the session information includes metadata from a capture session of the reference image. The method includes receiving, by the transceiver, an image correction model. The method also includes capturing, by an image sensor of the mobile communication device, an image while the mobile communication device is within a vehicle. Further, the method includes, modifying, by a processor of the mobile communication device, the captured image based, at least in part on the session information to produce an intermediate image. The method also includes, modifying, by the processor, the intermediate image using the image correction model to produce a corrected image, and transmitting, by the transceiver, data associated with the corrected image to the remote server.

Additional embodiments include a mobile communication device comprising a processor, an image sensor, a transceiver, and a computer readable medium or memory. The computer readable medium comprises code, executable by the processor, configured or programmed to perform the above-noted method.

Further details regarding embodiments of the invention can be found in the Detailed Description and the Figures.

TERMS

Figure 1:
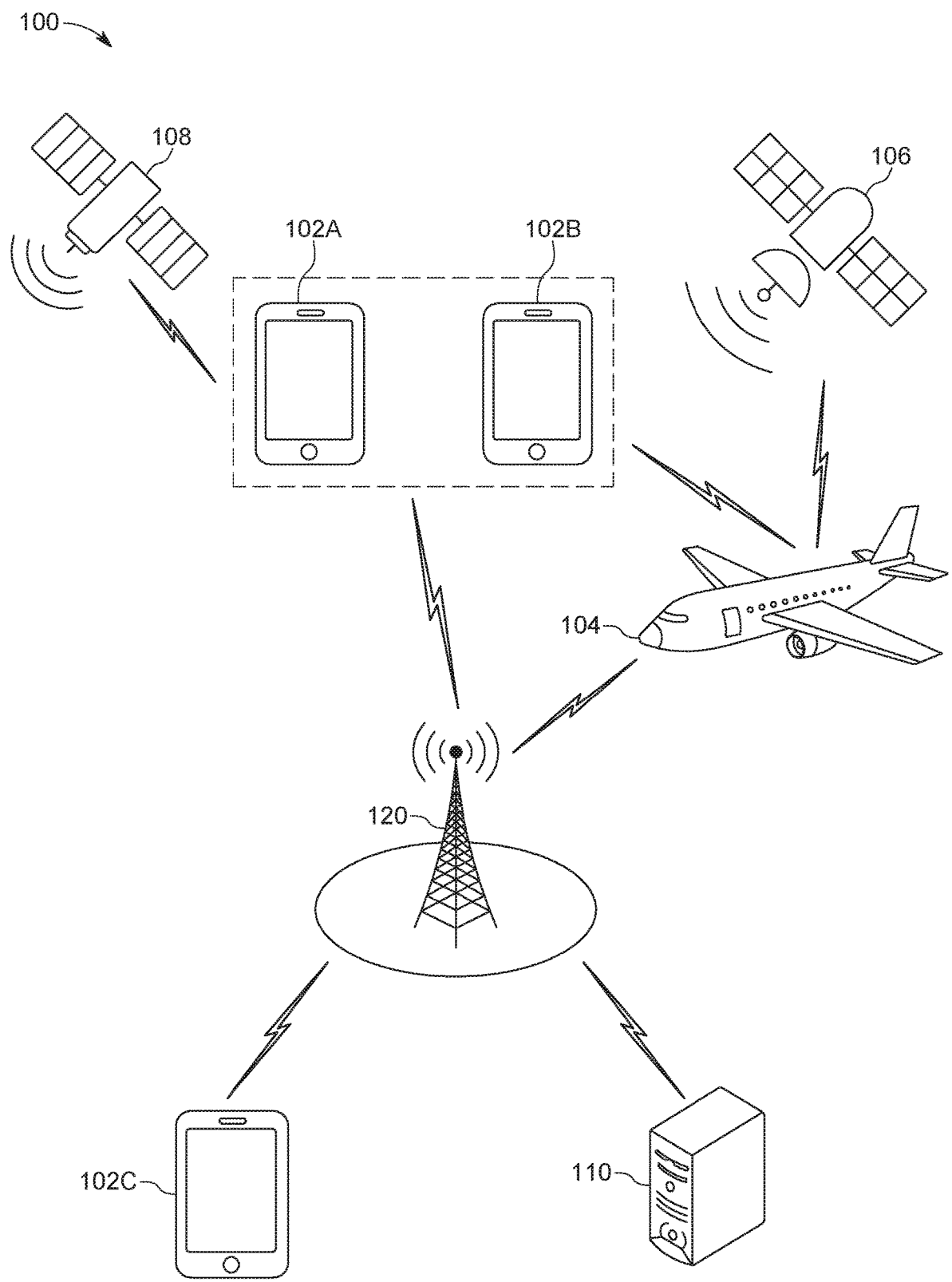
FIG. 1 is a system diagram of a crowdsourced surveillance platform according to an embodiment.

Prior to discussing embodiments of the invention, some terms can be described in further detail.

"Crowdsourcing" may refer to the practice of obtaining information or data from a large number of participants via a network. A crowdsourcing platform may enable the collection of data by matching participants with information collection/procurement tasks or projects according to a defined set of requirements. Participants may opt—in generally or accept specific tasks or projects. Data about completed tasks may be compiled by a crowdsourcing platform in order to monitor performance and provide analysis of collected information. In a crowdsourcing platform, one or more platform servers may maintain user records and profile information, identify tasks and projects, assign new tasks and projects, and monitor completion. Users may participate in the crowdsourcing platform via any computing device with a network interface that enables connection to platform servers.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "transceiver" may be any suitable device or devices that can both transmit and receive communications. In a mobile communication device, a transceiver may include all components required to send and receive communications, such as one or more antennae, a modem, etc. Thus, a transceiver may be any device or devices that act as a network interface for the mobile communication device.

An "image sensor" may be any suitable device or devices that can capture a digital representation of a real world environment. Image sensors attenuate electromagnetic waves interacting with environment objects into electrical signals. In a mobile communication device, the image sensor is digital rather than analog in nature. The image sensor may take the form of one or more digital cameras. For example, a mobile communication device may have a single digital camera, or may have a digital camera array. Other forms of digital sensors integrated into a mobile communication device may also be used to capture image data. Image sensors may include a variety of models and manufactures, thereby providing mobile communication devices with vary quality of captured images.

"Image capture" may refer to the capture of a single frame digital image, or recording of a set of images (i.e., rapid capture), and or capture of a video stream via an image sensor. Individual image frames may be sliced from image sets and, or video streams as needed to obtain surveillance images.

A "sensor" may be any device or devices capable of detecting changes in an environment and providing information about detected changes to a processor or other electrical components of a computing device. Example changes to the environment may include magnetic fields, temperature, altitude, gravity, brightness, speed, and more. Sensors in a mobile communication device may include ambient light sensors, proximity sensor, accelerometer, gyroscope, digital compass barometer, fingerprint sensor, device alignment sensor, and more. Sensors may be located throughout a mobile communication device and may communicate with other device components to enable information analysis on device.

A "mobile communication device" may comprise any electronic device that may be transported and operated by a user, which may also provide remote communication capabilities to a network. Examples of remote communication capabilities include using a mobile phone (wireless) network, wireless data network (e.g. 3G, 4G, 5G new radio/NR or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), edge devices, vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile communication device).

A "user" may include an individual. In some embodiments, a user may be associated with one or more accounts of a crowdsourced surveillance platform and, or a user of a mobile communication device.

A "server computer" or "server" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "access point" may be any device or devices that enable connection of user computing devices to a network.

An access point may enable connected mobile communication devices to connect to a broader communication network, e.g., a wide area network Access points may include components such as a router, modem, and a monitored power supply. Optionally, the access point may have the ability to identify power failures and automatically reconnect to the network when disconnected.

A "vehicle" may be any device of device for transporting people or cargo between locations. Example vehicles include airplanes, helicopters, dirigibles, trains, boats, submersibles, cars, trucks, tanks, and more.

A "reference image" is a digital representation of a target location. The image may be a picture of an environment, a building, a facility, an address, a region of space, etc. In a crowdsourced surveillance platform, a reference image may be the image file stored by a remote server in association with a target location. The reference image may be the last image captured of a target location by a platform user. Thus, the reference image may represent the last known state of the target location.

"Metadata" may be any data that provides information about other data. Meta data may be descriptive, structural, administrative, referential, statistical or legal in nature. Metadata may describe a resource file or its contents. Metadata may describe how a compound object is structured or put together. Metadata may describe how to manage a resource with which the metadata is associated, such as creation date and method, permissions, and type. Metadata may describe the content and quality of data with which it is associated. Metadata may describe the processes or methods used to collect the data with which it is associated. One or more forms of metadata may be associated with a captured image and transmitted along with the image either as part of the image or in addition to the image. For example, session information may refer to metadata describing conditions under which an image was captured and may be transmitted with an image. The session information may include sensor output, vehicle path information, time and date, weather conditions, type of vehicle, type of image sensor used to collect the image, and more. The session information may also include timestamp data, vehicle data, and, or weather data.

"Change data" may be data indicating a difference between two files. The result of comparing two files together in an "or" type operation may be a set of data including only that data which differs between the two files. For example, a comparison of two images of the same target, taken at different times, may result in a data set including the difference in color between corresponding pixels of the image files. Only image pixels in which color varies between the two images may be included in the change data set. Thresholds may be implemented to adjust an amount of variation that is tolerated before data is added to the change data set.

"System data" may include data that that enables low-level operation of a computing device. This data may include descriptions of the make, model, type, and capabilities of system components. This data may relate to interfaces used by system components to communication.

"Vehicle movement data" may be data that describes or is associated with transition of a vehicle from one location to another. Vehicle movement data may include average speed, allowed speeds along a travel path, actual altitude along a travel path, permitted altitude along a travel path, actual depth, permitted depth, estimated duration of travel, etc. This information may relate to the manner in which a vehicle proceeds from the beginning to the destination.

"Travel path information" may be data that describes or is associated with a path of travel for a vehicle. Travel path information may include a trajectory, a route, a lane, etc. Travel path information may further include information from which a travel path may be derived. Carrier name, vehicle identification, route identification, destination, starting point, time and date, and other information that may be provided to a carrier or third party service in order to obtain a predicted travel path for a vehicle.

A "resolution characteristic" may be any suitable parameter that relates to the resolution of a digital image.

An "image correction model" may be any suitable model for adjusting or modifying characteristics of a digital image. Image correction models may be mathematical models applied to pixels of a digital image to modify the color, scale, orientation, shift, perspective, resolution, zoom, or other image characteristics. Image correction models may act on all or a portion of the pixels of a digital image.

A "power resource requirement" refers to an amount of power needed to execute and complete a task on a computing device. The amount of power needed may be a minimum, optimum, or desired energy.

A "power reserve" may be an amount of power currently stored in a battery of a computing device. The battery may be any suitable energy storage device within a computing device. Batteries suitable for use with mobile communication devices may include lithium ion, lithium ion polymer, lithium cobalt, lithium manganese, lithium phosphate, lithium titanate, etc. The current power reserve may indicating a remaining amount of energy stored in the battery.

A "sensor status request" may be an electronic message indicating one or more sensors of a mobile communication device for which a current status is needed. The sensor status request may be generated by a remote server of the crowdsourced surveillance platform and transmitted to the mobile communication device of a user. The sensor(s) indicated in the request may be selected based on a model, make, or other characteristic of the mobile communication device to which the request is sent. The sensor(s) indicated in the request may be a default listing of sensors. Thus, an initial sensor status request may indicate a list of possible sensors of interest on a mobile communication device. A sensor response message may be returned to the remote server from the mobile communication device and may indicate the existence and activity level of the sensor(s). This information may be stored by the remote server in connection with a user account, enabling future sensor status requests to indicate only sensors specific to the mobile communication device.

A "task cancellation message" may be a message indicating that a platform-assigned task is being or has been cancelled. The task cancellation message may be generated by a mobile communication device and transmitted to a remote server of the crowdsourced surveillance platform to inform the remote server that a task assigned to the user of the mobile communication device cannot be completed. The task cancellation message may include a task identifier, a target location, and, or an explanation for the cancellation.

DETAILED DESCRIPTION

Systems and methods according to embodiments enable secure crowdsourced surveillance by matching users with image capture tasks of target locations located along a path that the user will be travelling. Mobile communications devices may be used to provide travel path information to the crowdsourced surveillance platform, receive task information, and capture images of a target location indicated in the assigned task. One or more remote servers of the crowdsourced surveillance platform may aggregate captured image data and process it to obtain current image information for target locations.

Current surveillance techniques often employ one or both of unmanned vehicle (UMV) and satellite imaging to provide map updates. Despite proliferation of commercial satellite enterprises, use of satellite imagery remains prohibitively expensive for most surveillance consumers. A shoebox-sized cubesat made with off-the-shelf parts can cost millions to build, test, and launch with other payloads on board a commercial rocket. These satellites also cannot realistically have any hardware or sensors upgraded once the device is in orbit. These satellites must be tracked and de-orbited at the end of their useful life in order to safely burn up in the atmosphere, and pose a very real collision threat to other satellites and objects in earth's orbit. As a result, revisit rates (the time elapsed between observations of the same point on earth and a satellite) have held steady around 1 per day in best-case scenarios with some imaging satellites provide revisit rates as much as 5-10 days apart. These revisit rates may be insufficiently short to enable understanding and characterization of the rapid changes driven by human activity or unusual events.

UMV-based image capture also presents problems in that the devices have a limited travel duration and range. Using UMVs to obtain a substantial data set of images for a target location would require a fleet of UMVs that can be sent out at regular intervals to reimage the same locations. Regulatory scrutiny by the Federal Aviation Administration (FAA) and other governing bodies have also posed a challenge to their efficacy by mandating line-of-sight operation by a human and requiring certification in order to legally operate certain classes of UMVs. This makes reliable UMV-based surveillance resource intensive if not logistically impossible for many surveillance consumers.

A unifying limitation across all earth imaging techniques and platforms is weather. UMVs are susceptible to high winds, precipitation and extreme temperatures; satellites are at the mercy of cloud cover to obtain quality images of the earth. Sustained periods of inclement weather often result in days-long gaps in image data, particularly during critical periods where the capturing an image of a ground target may be directly correlated with the weather event.

Certain embodiments present significant advantages in the provision of on-demand surveillance of target locations by leveraging a large volume of mobile communication devices to capture images. A crowdsourced surveillance platform ("the platform") receives requests from clients desiring surveillance of target locations. These requests are then matched, by the platform, with users travelling near the target location. Users capture images of the target location and transmit image data associated with the target location back to the platform for processing. The more users travelling near the target location the higher the volume of image updates that are provided to the platform. Clients may query the platform for updated images of target location.

Embodiments include path-based image capture scheduling that capitalizes on routes that a user already plans to travel. User-provided travel path information is used by the platform to identify a travel route. For example, a start and end point may be used to identify one or more possible highway routes. In another example, a flight number ad carrier name may be used to obtain flight path information. The remote server may use a resultant predicted travel path to identify target locations lying within a threshold distance of the predicated travel path. For each identified target location, a capture task may be generated and sent to the user's mobile communication device for review. Generated tasks are stored in the remote server and may include information necessary for tracking task completion and user progress toward the target location. Each predicted travel path may lie within a threshold distance of multiple target locations. As a result, a user embarking on a trip may be sent multiple capture tasks to review and accept or decline.

Accepted capture tasks are scheduled for completion within a software application executing on the user's mobile communication device. Each capture tasks has an associated reference image representing the most current useful image of the target location. Capture tasks are queued according to order of visitation along the predicated travel path. As the vehicle in which the mobile communication device is located progresses along the travel path, capture tasks will become available for completion, prompting the user to initiate capture of an image of the target location.

Embodiments may include correction of captured images to account for variation in image sensors, capture perspective, and capture environment of the mobile communication device. Each participant mobile communication device may be provided with an image correction model that corrects a captured image. The image correction models may be different for each capture task or may be common to a predicted travel path or journey. The image correction models may be selected or developed based on an image sensor model, make, or type of the mobile communication device responsible for completing the capture task. Image sensor information may be transmitted to a remote server upon task acceptance or at the beginning of a journey. The remote server may develop or select an image correction model based on the image sensor information. Further, the image correction model may be developed or selected based on a predicted weather pattern, a capture environment of the vehicle. Captured images may be corrected using he selected image correction model and also corrected for image sensor position differences with the reference image.

Corrected images are compared to the reference image for a capture task in order to obtain change data. This data set represents changes or differences between the captured image and the reference image. The change data is transmitted to the remote server in a task completion message. Any relevant capture session information may also be provided to the remote server to enable efficient capture task generation in the future. Change data is used by the remote server to update the most current image of a target location.

Embodiments may include the detection of one or more sensors implemented within a mobile communication device. Sensor detection may occur as part of a gap analysis performed by the software application. This gap analysis may enable the software application determine whether the onboard sensors are sufficient for collecting information about a capture session. If the sensors are not sufficient, alternative sources for travel information may be obtained. As an example, flight tracker databases may be used to estimate predicted speed and altitude along a flight path. The sensor output or substitute movement information may be captured as session information for a capture session and transmitted to the remote server along with change data.

Embodiments ensure the collection of surveillance images by mobile communication devices by employing power management techniques during travel. The software application may monitor power consumption by the mobile communication device and compare current power consumption against a power resource requirement needed in order to complete a capture task. One or more sensors may be disabled or polled less frequently to reduce power consumption. Similarly, location tracking may be disabled or polled less frequently to further improve power consumption.

The various embodiments disclosed herein provide solutions for enabling on-demand surveillance using mobile communication devices. By enabling the collection of image data during pre-existing travel sessions, the platform avoids extraneous trip scheduling, as would be required for UMVs. By leveraging the imaging capabilities of mobile communication devices, which are carried by most travelers, the platform is able to provide relatively short revisit intervals that can be customized according to client needs. This revisit interval customization reduces the likelihood that inclement weather patterns will render large portions of captured images of a target location useless.

I. The Crowdsourced Surveillance Platform Environment

The collection and aggregation of images of target locations by mobile communication devices provides an opportunity for fast and efficient updating of surveillance images. Users travelling along known or regularly traveled travel paths may enable low revisit times and frequent updating of surveillance imagery. Users may capture images using a mobile communication device and transmit data associated with the captured image to a processing center, such as the host of the crowdsourced surveillance platform. Terrestrial cellular networks, wireless data networks, and satellite networks may be leveraged to enable users of different travel modalities to capture and transmit image data predictably.

Referring to FIG. 1, infrastructure is illustrated for a system 100 supporting a crowdsourced surveillance platform. One or more mobile communication devices 102A, 102B may be removeably located or positioned within or on a vehicle 104, shown in FIG. 1 as an aircraft. While in transit via the vehicle 104, mobile communication devices 102A, 102B may acquire network access from an access device (not shown) onboard the vehicle 104. The access device may provide network access via a satellite link. 106. Network access may enable the mobile communication devices 102A, 102B to send and receive data via a network including one or both of a cellular network and the Internet. Thus, mobile communication devices 102A, 102B may maintain data transfer capabilities while in transit within or on a vehicle 104.

Geospatial data related to the mobile communication device 102A, 102B location and progress along a travel path may be obtained during transit. The mobile communication devices 102A, 102B may obtain geospatial data from a global positioning system (GPS) 108. IN addition to, or as an alternative to GPS system 108 data, geospatial data may be obtained from the vehicle itself or via network access from remote systems. This data may include the speed, velocity, altitude, depth, location, and other movement related data for the vehicle 104 and, or the mobile communication device 102A, 102B. If GPS data is unavailable or a GPS system 108 connection is not reliably available, the mobile communication device 102A, 102B may use these alternative data sources or obtain geospatial data as substitute movement data A base station 120 provides the mobile communication devices 102A, 102B with access to a network such as a cellular network and, or the Internet, when the mobile communication devices are within range. When the vehicle 104 has a height, depth, or distance at or below a threshold, then the mobile communication devices 102A, 102B may connect to the base station 120 to bi-directional facilitate data communications. The base station 120 may be multiple base stations 120. The base station 120 may represent a component of a cellular network infrastructure or local area network infrastructure. The base station enables communication with other mobile communication devices 102C on the ground as well as a remote server 110 of a crowdsourced surveillance platform. Thus, mobile communication devices 102A, 102B, 102C may communicate with the remote server 110 whether they are grounded or are in transit within or on a vehicle 104.

The remote server 110 may include various databases, data lakes, software program products, application interfaces for hosting a crowdsourced surveillance platform. The remote server 110 may include a single server, multiple servers, server farms, or data centers, etc. The remote server may store user profile information, client request information, travel information for users, task scheduling data, image and map data, and other information for supporting the crowdsourced surveillance platform. Any portion of this information may be communicated to or from mobile communication devices 102A. 102B, 102C via the various forms of network access shown in FIG. 1.

Mobile communication devices 102A, 102B, 102C may receive a variety of communications from remote server 110 including task assignments. Tasks assignments are generated by remote server 110 based on a client request for target location surveillance. The remote server 110 receives client requests for target location surveillance and stores the target location, GPS coordinates or the location, requested revisit frequency and any other relevant information. Information provided in a surveillance request may be used to identify users who can obtain images of the target location. The remote server 110 may facilitate matching of platform users to target location surveillance requests. Once a match is identified, a task can be generated and stored by the remote server 110 in association with the target location and a user who can carry out the task. The task is then assigned to a user and the task assignment transmitted to the mobile communication device 102C of the user in a task assignment message. Each task assignment can be accepted or rejected by the user of the mobile communication device 102C.

Task assignment messages received by the mobile communication devices 102A, 102B, and 102C may trigger the display of a task acceptance user interface, enabling a user to accept responsibility for completing the task or decline. The results of the acceptance selection are transmitted back to the remote server 110. Declined tasks may be deleted from the task tracking data structures of the remote server 110 or reassigned to another user. Mobile communication devices 102A, 102B, 102C may accept tasks prior to or while in transit in a vehicle 104 If the task is accepted, then the remote server 110 may begin task progression tracking and may, if needed, send additional information to an accepting mobile communication device 102, 102B, 102C. Alternatively, the additional information may be provided in the original task assignment message. Additional information may include a reference image and session information for a capture session of the reference image.

A software application running on the mobile communication device 102A, 102B, 102C may receive the task assignment message, facilitate task acceptance or decline, and store reference images and session information of accepted tasks in a secure location in memory. This may prevent the user from accessing the reference image, session information, and any identifying information about the target location.

While the mobile communication device 102A, 102B is onboard the vehicle 104, the location of the mobile communication device 102A, 102B may be tracked using communications with GPS system 108 or substitute movement data. As the vehicle 104 travels along a predicted travel path, the mobile communication device 102A, 102B may update the device's position and calculate the distance between that position and the target location, based on information provided in the session information as well as the GPS system 108 feedback or substitute movement data. Once the mobile communication device 102A, 102B is within a threshold distance from the target location, the software application may instruct the user to position the mobile communication device 102A, 102B such that an image sensor can capture an image of the target location. In some embodiments, a graphical user interface associated with the software application may provide image capture guidelines. When the target location appears within the guidelines, the mobile communication device 102A, 102B may automatically initiate capture of the image. In another embodiment, the mobile communication device 102A, 102B may display an instruction to a user to initiate the capture of the image once the target location is within the guidelines.

Data associated with captured images is transmitted to remote server 110. Captured images are preprocessed on the mobile communication device 102A, 102B to normalize image sensor model and positioning differences. The captured image may be compared to the reference image to identify pixels that are not the same. The set of these different pixels may be temporarily stored as change data and transmitted with capture session information to the remote server 110. Once received by the remote server 110, the change data, reference image, and all session information may be deleted from the secure storage of the mobile communication device 102A, 102B.

Remote server 110 collects change data from all participating mobile communication devices 102A, 102B, 102C. Change data and capture session information may be used to update the stored reference image for a target location, such that the reference image matches the captured image when the updating is complete. Further, the remote server 100 may retain previous reference images to provide a visit timeline for a target location. In this manner, surveillance for the target location may be provided by many different users travelling along the same or similar travel path near the target location. Surveillance information may be provided to clients on a reoccurring or as requested basis.

Figure 2:
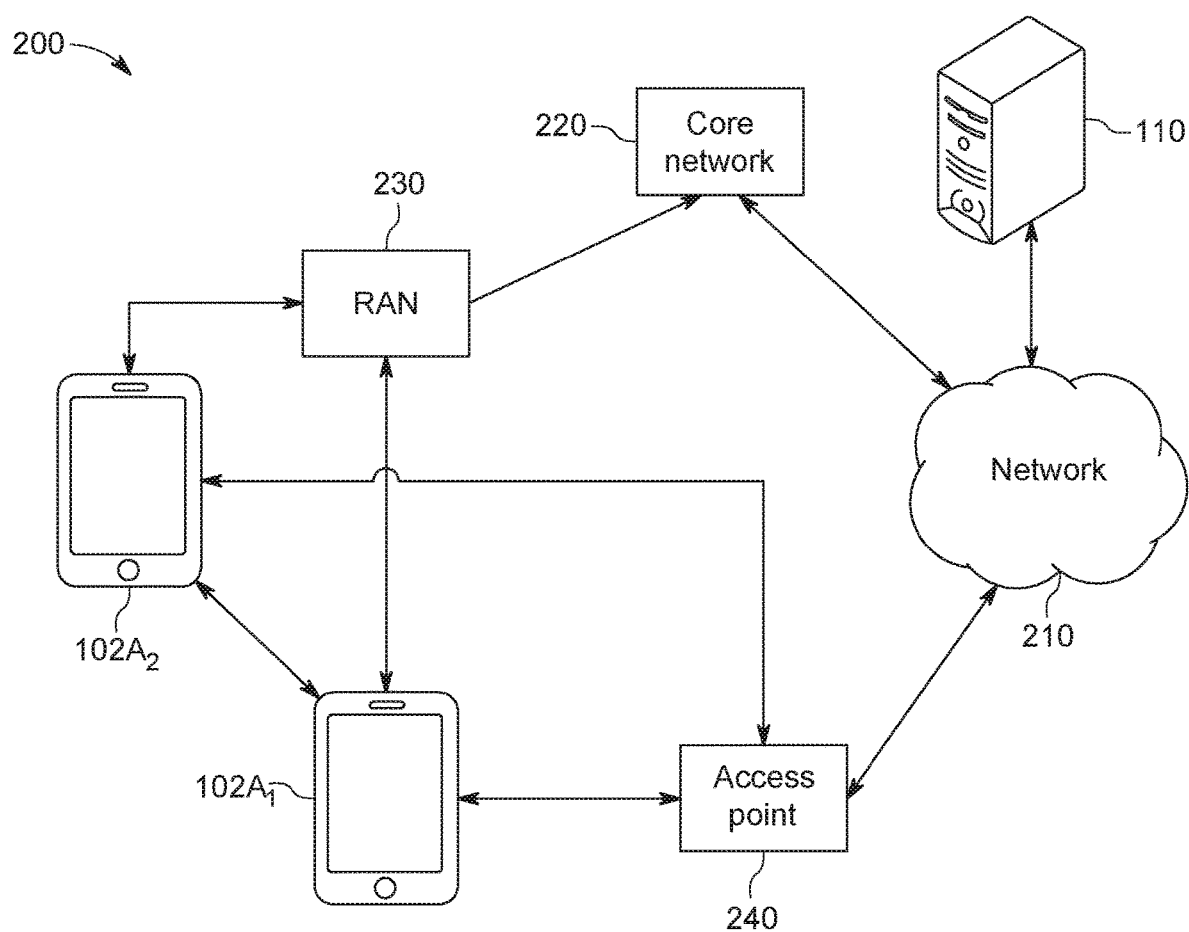
FIG. 2 is a block diagram of an exemplary communication infrastructure in a crowdsourced surveillance platform according to an embodiment.

Referring to FIG. 2, there is illustrated a high-level system architecture of a system 100 for enabling a crowdsourced surveillance platform. With reference to FIGS. 1 and 2, the system 100 may be implemented using a variety of mobile communication devices 102A, 102B, 102C, including those of the same type such as 102A1, 102A2 . . . 102An (not shown). The various types of supported mobile communication devices 102, 102B, and 102C may include smart phones, tablet computers, wearable devices, etc. These mobile communication devices 102A1, 102A2 (or 102B, 102C) are configured to communicate with am access network (e.g., a radio access network RAN 230, an access point 240, etc.) over a physical communications interface or layer such as air interfaces and/or a direct wired connection. Air interfaces may be an given cellular communications protocol (e.g., GSM, CDMA, W-CDMA, EVDO, eHRPD, EDGE, 4G LTE, 5G LTE, 5G NR/New Radio, etc.) and, or a wireless IP protocol (e.g., IEEE 802.11 family).

The RAN 230 may include a plurality of access points that serve mobile communication devices 102A1, 102A2 over air interfaces. The access points in the RAN 230 can be referred to as access nodes or ANs, access points or APs, base stations or BSs, Node Bs, eNBs, gNBs, and so on. These access points can be terrestrial access points (or ground stations), or satellite access points. The RAN 230 may be configured to connect to a core network 220 that can perform a variety of functions, including bridging circuit switched (CS) calls between mobile communication devices 102A1, 102A2 served by the RAN 230 and other mobile communication devices 102B, 102C served by the RAN 230 or a different RAN altogether, and can also mediate an exchange of packet-switched (PS) data with external networks such as Internet 210. As used herein, the RAN 230, the core network 220 or a combination thereof may be referred to as a terrestrial wireless communication subscriber network.

The Internet 210, in some examples includes a number of routing agents and processing agents. Mobile communication devices 102A1, 102A2 may also connect to the Internet 210 directly (i.e., separate from the core network 220). For example mobile communication devices 102A1, 102A2 may connect to the Internet 210 over an Ethernet connection of WiFi or 802.11-based network. The Internet 210 can thereby function to bridge packet-switched data communications between mobile communication devices 102A1, 102A2 via the core network 220. Also shown in FIG. 2 is an access point 240 that is separate from the RAN 230. The access point 240 may be connected to the Internet 210 independent of the core network 230 such as via an optical communications system and modem. For example, an air interface may serve mobile communication devices 102A1, 102A2 over a local wireless connection, such as IEEE 802.11. The access point 240 may be a modem, router, or wireless hotspot such as for a WiFi router, which may have one or more of wired and wireless connectivity.

The remote server 110 may be connected to the Internet 210, the core network 230, or both. The remote server 110 can be implemented as a plurality of structurally separate servers, or alternately may correspond to a single server. The remote server 110 may correspond to any type of server, such as a web server (e.g., hosting a web page), an application download server, or an application server that supports particular communicative service(s) such as IP Multimedia Subsystem (IMS) service, social networking services, etc.

Further, mobile communication devices 102A1, 102A2 may be part of a device to device (D2D) network or D2D group, in which mobile communication devices 102A1, 102A2 are connected to the RAN 230 via the air interface. In an embodiment, the mobile communication devices 102A1, 102A2 may also gain indirect access to the RAN 230 via mediation by one another, in which data 'hops' to/from mobile communication device 102A2 to mobile communication device 102A1, which communicate with the RAN 230 on behalf of mobile communication device 102A2. The reverse configuration of data hopping between mobile communication device 102A1 and mobile communication device 102A2 may also enable data flow to and from the RAN 230.

Figure 3:
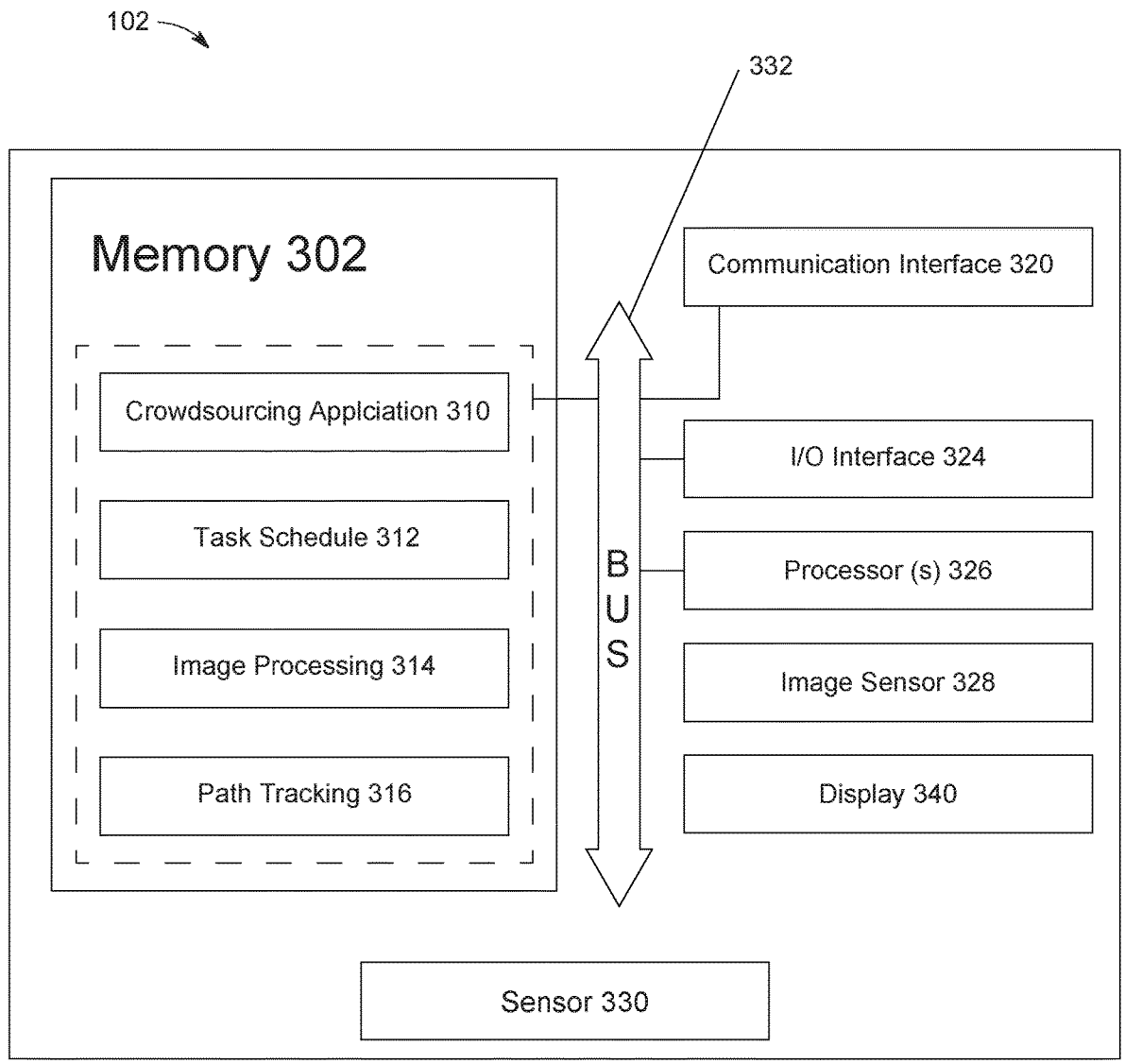
FIG. 3 shows a block diagram of a mobile communication device according to an embodiment.

Referring to FIG. 3 illustrates a mobile communication device 102 such as mobile communication device 102A. With reference to FIGS. 1-3, the mobile communication device 102 may represent any f mobile communication devices 102A, 102B, 102C, etc. within the system 100 for supporting a crowdsourced surveillance platform. The mobile communication device 102 may have additional components and, or features according to various implementations of the disclosed embodiments. The illustrated components enable the described functionality of the crowdsourced surveillance platform, but are not intended to be limiting.

The mobile communication device 102 includes one or more processor(s) 326 (e.g., ASICs, digital signal processors (DSPs), etc.). That is, the processor 326 can be implemented as one or more integrated circuits (e.g., one or more single core or multicore microprocessors and/or microcontrollers), and is used to control the operation of mobile communication device 102. The processor 326 can execute a variety of programs in response to program code or computer-readable code stored in the system memory 302.

The memory 302 can be implemented using any combination of any number of non-volatile memories (e.g., flash memory) and volatile memories (e.g. DRAM, SRAM), EEPROM, or any other non-transitory storage medium, or a combination thereof media. Memory 302 may store a mobile operating system and a mobile application environment where one or more mobile applications reside (e.g. a crowdsourcing application 310, etc.) to be executed by the processor 326. Also, the memory 302 may store computer code, executable by the processor 326, for performing any of the functions described herein. Further, memory 302 may include partitions, or other sections of secure storage accessible only by applications operating on the secure memory. That is, applications without permissions to access the secure memory may not gain access to store, maintain, or manage data therein.

The memory 302 may also store a crowdsourcing application 310, a task scheduler module 312, an image processing module 314, as well as a path tracking module 316, which may interface with one another to provide the user-side experience of the crowdsourced surveillance platform. The crowdsourcing application 310 may be a mobile application executing on the mobile communication device 102 that enables and facilitates the entry of travel information, visual task tracking and progression, path updates, and image capture and processing functionality. The crowdsourcing application 310 may include or interact with a task scheduling module 312 that receives new tasks from the remote server 110 and may queue them according to a task scheduling algorithm. The image processing module 314 may receive the images captured via the crowdsourcing application 310 and may modify, alter, correct, or otherwise process the images, compare the result to a reference image, and provide the crowdsourcing application with a set of change data representing differences between the processed or modified image and the reference image. The path tracking module 316 may track progress of the user device 102 within or on a vehicle travelling to a destination. This tracking information may be provided to the crowdsourcing application 410 for task progression updating, or visual representation of path progress.

Mobile communication device 102 also optionally includes one or more input/output (I/O) interface 324. Example I/O interfaces 324 may include a keyboard and mouse, a touchscreen, a microphone, and one or more buttons (e.g., volume or power buttons, etc.), which may be integrated into a display 340. In an example, the I/O interface 324 and display 340 are optional because the mobile communication device 102 need not interface with a user in all implementations. For example, if the mobile communication device 102 is implemented as a wireless communications component of an edge device, the mobile communication device 102 may be interfaced with via remote connections instead of a local I/O interface.

The mobile communication device 102 further includes one or more communications interfaces 320 which may be wireless and wired. In an example, the communications interface 320 may be optional because some mobile communication devices 102 may be configured for wireless communication only). In an example embodiment, if made part of the mobile communication device 102, a wired component of communication interface 320 may be used to support wired local connections to peripheral devices (e.g., a USB connection, a mini USB or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless component of the communications interface 320 includes one or more wireless transceivers for communication in accordance with a local wireless communications protocol (e.g., WLAN or WiFi, WiFi Direct, Bluetooth, etc.) and/or one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, LTE, 4G, 5G LTE, 5G NR or other protocols that may be used in a terrestrial wireless communication subscriber network). In another example embodiment, the wireless component of the communication interface 320 may include one or more transceivers for communicating with a navigation system such as a global positioning system (GPS). The various components of the mobile communication device 102 can communicate with each other via a bus 332.

The display 340 may be configured as a touchscreen display, and may be communicatively coupled to peripheral buttons such as a power control button, a volume or vibrate control button, an airplane mode toggle button, etc., and at least one front-panel button such as a Home button, among other components. While not shown explicitly as part of the mobile communication device 102, the display 340 can include one or more external antennas and/or one or more integrated antennas that are built into the external casing of the mobile communication device 102, including but not limited to WiFi antennas, cellular antennas, satellite position system (SPS) antennas (e.g., global positioning system (GPS) antennas), and so on.

The mobile communication device 102 may have a number of sensors 330 communicatively coupled to the processor 326. The sensor 330 may convert signals from one form to another, such as by taking environmental measurements and converting the signal into processor-readable form. The sensors 330 may capture mobile communication device and, or environmental information and provide this to the processor 322 for use in performing the methods and techniques described herein.

Figure 4:
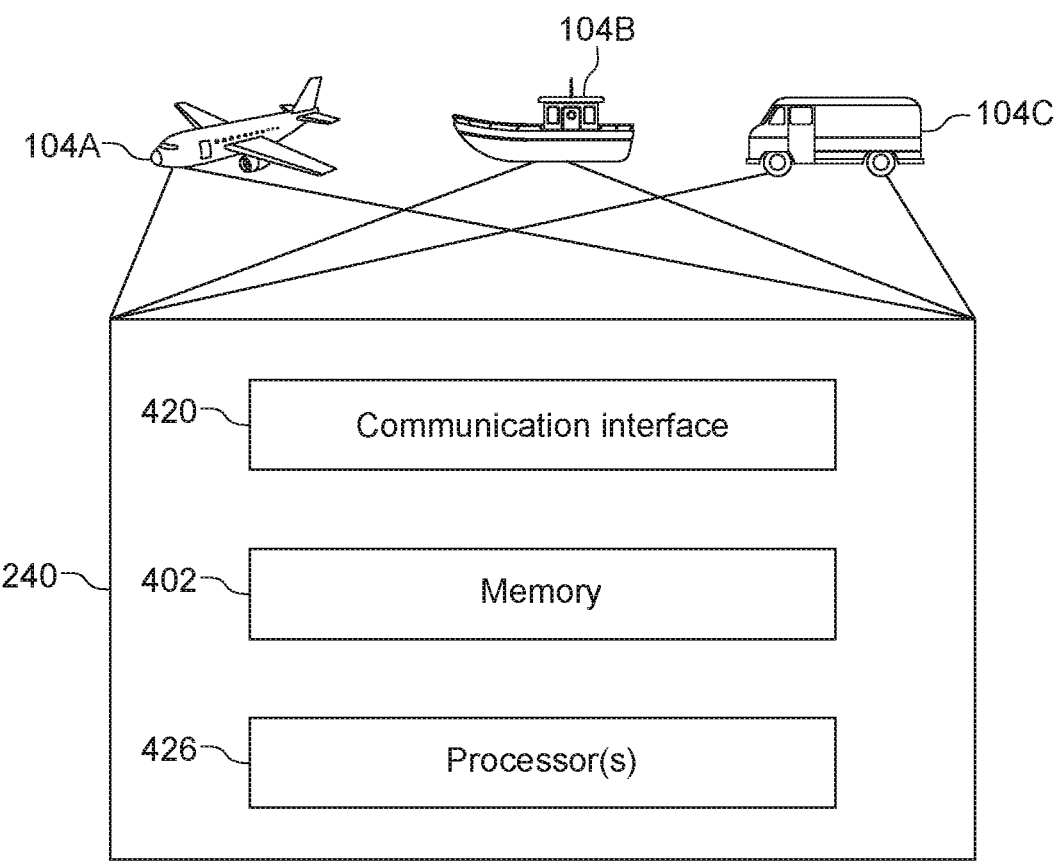
FIG. 4 shows a block diagram of an access device in accordance with some embodiments.

FIG. 4 shows a block diagram of an access point in accordance with some embodiments. With reference to FIG. 104, the access points 240 are located within, on, or are integral to vehicles 104A, 104B, and 104C and provide various communication services. The access point 240 may have one or more processors 426, coupled to a computer readable medium in the form of memory 402, and communication interface 420.

Embodiments include an access point 240 that includes communication interfaces 520 that enable air-to-ground communications and satellite communications that provide in-transit wide area access to users within the vehicle 104. As described with reference to FIG. 2, the system 200 (i.e., an air-to ground system) includes a terrestrial relay point (e.g., an up-tilted antenna coupled to an eNodeB, base station, or other communications system coupled to a network) that directly communicates with mobile communication devices 102. When using satellite communications, the vehicle 104 communicates with a non-terrestrial relay (e.g., satellite 106), which communicates signals to the terrestrial system 200 via satellite band signal receiver and associated circuitry. Exemplary satellite band signals use a portion of the electromagnetic spectrum allocated to satellite communications, including signals operating in the Super High Frequency (SHF) band (e.g., 3 to 30 GHz), C band (e.g., 4 GHz to 8 GHz), G band (e.g., NATO G band of 4 GHz to 6 GHz, IEEE G band of 110 GHz to 300 GHz, or obsolete G band 140 MHz to 220 MHz), H Band (e.g., 6 GHz to 8 GHz), Ku band (e.g., 12 GHz to 18 GHz), Ka band (e.g., 26.5 GHz to 40 GHz), L band (e.g., 40 GHz to 60 GHz or 1 GHz to 2 GHz), X band (e.g., 7 GHz to 12 GHz), and F band (e.g., 3 GHz to 4 GHz), or other portions of the electromagnetic spectrum suitable for long-distance radio telecommunications. When using air-to-ground communications, the vehicle 104 communicates with cell towers, i.e., baste station 120, which communicate signals to terrestrial system 200. Exemplary air-to-ground signals use sets of frequency ranges within the ultra high frequency band allocated for cellular phone use (e.g., 800 MHz).

The access point 240 may include one or more of air-to-ground communications links, satellite communications links, local area network (e.g., WiFi) equipment, a RAN (similar to RAN 230), which is coupled to core network 220. The access point 240 may thus enable services including: advanced Mi-Fi puck, Internet, video, video calling, and voice/text (e.g. short message service (SMS) or voice calls to native applications or number). An access point 240 may include a wireless router that serves as a mobile WiFi hotspot, e.g., connects to core network 220 and provides Internet access for multiple devices in the vehicle 104. In addition, the access point 104 is compatible to various regional services (e.g., United States and European Union).

Figure 5:
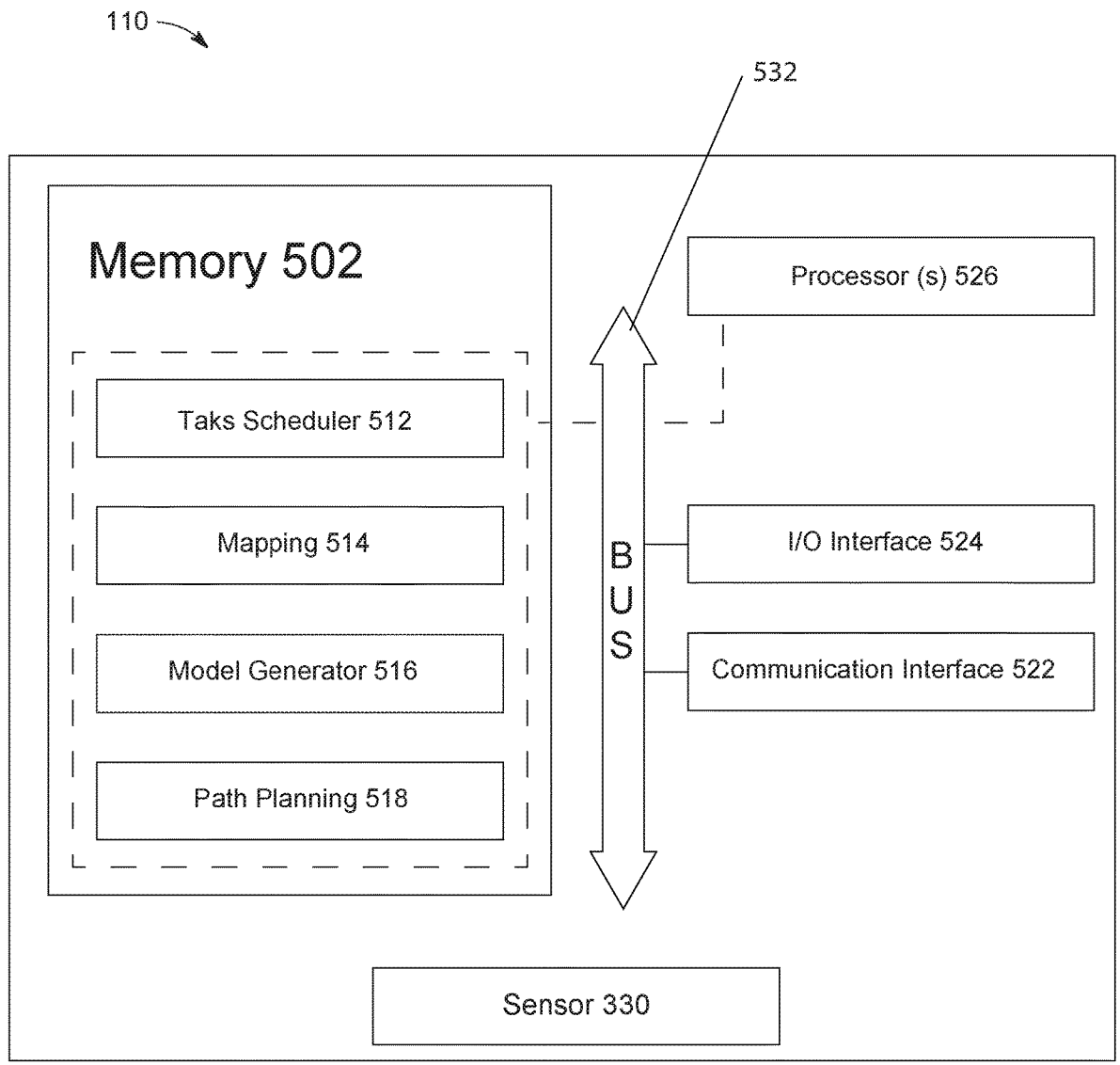
FIG. 5 shows a block diagram of a remote server in accordance with some embodiments.

FIG. 5 shows a block diagram of a remote server in accordance with some embodiments. With reference to FIGS. 1-5 the remote server 110 may have one or more processors 526, coupled to a computer readable medium in the form of a memory 502, an I/O interface 524, and communication interface 522. These components may be communicatively coupled by bus 532.

The remote server 110 includes a processor 526 coupled to memory 502 which may include both volatile memory and a large capacity nonvolatile memory, such as a disk drive or solid state drive. The remote server 110 may also include a floppy disc drive, compact disc (CD) or DVD disc drive coupled to the processor 526. The remote server 110 may also include communication interface 520, such as network access ports, coupled to the processor 526 for establishing data connections with a network 210, such as a local area network coupled to other broadcast system computers and servers or to the Internet. The I/O interface 523 may include output circuitry configured to present information and input circuitry configured to receive local user input.

The memory 502 of the remote server 110 include multiple software applications, algorithms, and modules for facilitating a crowdsourced surveillance platform. For example, memory 502 may include a task handler module 510, a mapping module 514, a model generator module 516, and path planning module 518. These modules may include software applications, algorithms, and other processor-executable code or instructions for performing back-end operations of the crowdsourced surveillance platform.

The task handler module 510 may receive travel information from users of the crowdsourced surveillance platform. That is, users of mobile communication devices 102 may transmit travel information over the network 210 or the core network 220, etc. to the remote server 110. The task handling module may receive the travel information and may generate a system task for the user. The task may be stored in a database associated with memory 502 and may include an identifier or account information for the user assigned the task along with the travel path information and an identifier for the target location. The task handler module 510 may communicate with the path planning module 518 to estimate a travel path for the user to whom the task is assigned. The path planning module 518 may communicate with external data repositories or resources to obtain path data based on the travel information. For example, the path data may be flight path data for a flight designated in the travel information received by the remote server 110. Path data may include roadway or waterway information such as available paths, speed limits, etc. for a road system and, or a waterway. The path planning module 518 may use the path data to identify portions of the travel path that will place the user within a threshold distance of the target location. The estimated travel path, along with the GPS coordinates representing the beginning and end of the portion of the travel path during which the user is in range of the target location, may be passed to the task handler module 510 and associated with the task. This information may be transmitted to the mobile communication device 102 of the user as part of a task assignment message.

The model generator module 516 may select or generate an image correction model for the generated task. The task handler module 510 may provide the model generator module 516 with target location information, and optionally the portion of the estimated travel path in which the user will be in range of the target location. Model generation module 516 may obtain weather data for the region encompassing the target location and the portion of the travel. Model generation module 516 may also obtain information about the window type and material specifications for the vehicle 104 in which the user is travelling. In some embodiments, the model generation module may use stored data about the image sensor make, model, and type for the image sensor of the mobile communication device 102 of the user assigned to the task. In other embodiments, the image sensor make, model, settings, and type may be provided along with the travel information transmitted from the mobile communication device 102 to the remote server 110 and received by the tasks handler 510. The model generation module 510 may use one or more of the image sensor model information, weather data, and window data to generate an image correction model. The model generator module 516 may pass the selected or generated image correction model to the task handler, which may transmit the image correction model to the mobile communication device 102 prior to the time of the user's departure. The generation and provision of an image correction model to the user may occur after assignment of the task, at the same time as task assignment, just before initiation of travel, or any other time after the task is generated. Model accuracy may be improved by selecting or generating the model close to the time of travel, because weather data is likely to be more accurate than weather data from a week or more before the time of travel.

The mapping module 512 may receive data associated with images captured by mobile communication devices 102, and may use the data to update an image map. The data may be change data indicating a difference between the captured image and a reference image provided to the user. The reference image may be provided by the task handler module 510.

II. Collecting In-Transit Images

The crowdsourced surveillance platform assigns image capture tasks to travelling users based on user-supplied travel information. After accepting any tasks assigned for an upcoming journey, users engage in their normal travel procedures via a chosen modality. Images are captured by users of mobile communication devices 102 as the vehicle 104 in which the user is travelling approaches a target location. Commercial travel paths may experience large numbers of travelers each day, providing potential for a high volume of captured images of target locations lying along the travel path. The server may control the volume and frequency of captured images by controlling the number of tasks assigned for a given target location.

Figure 6:
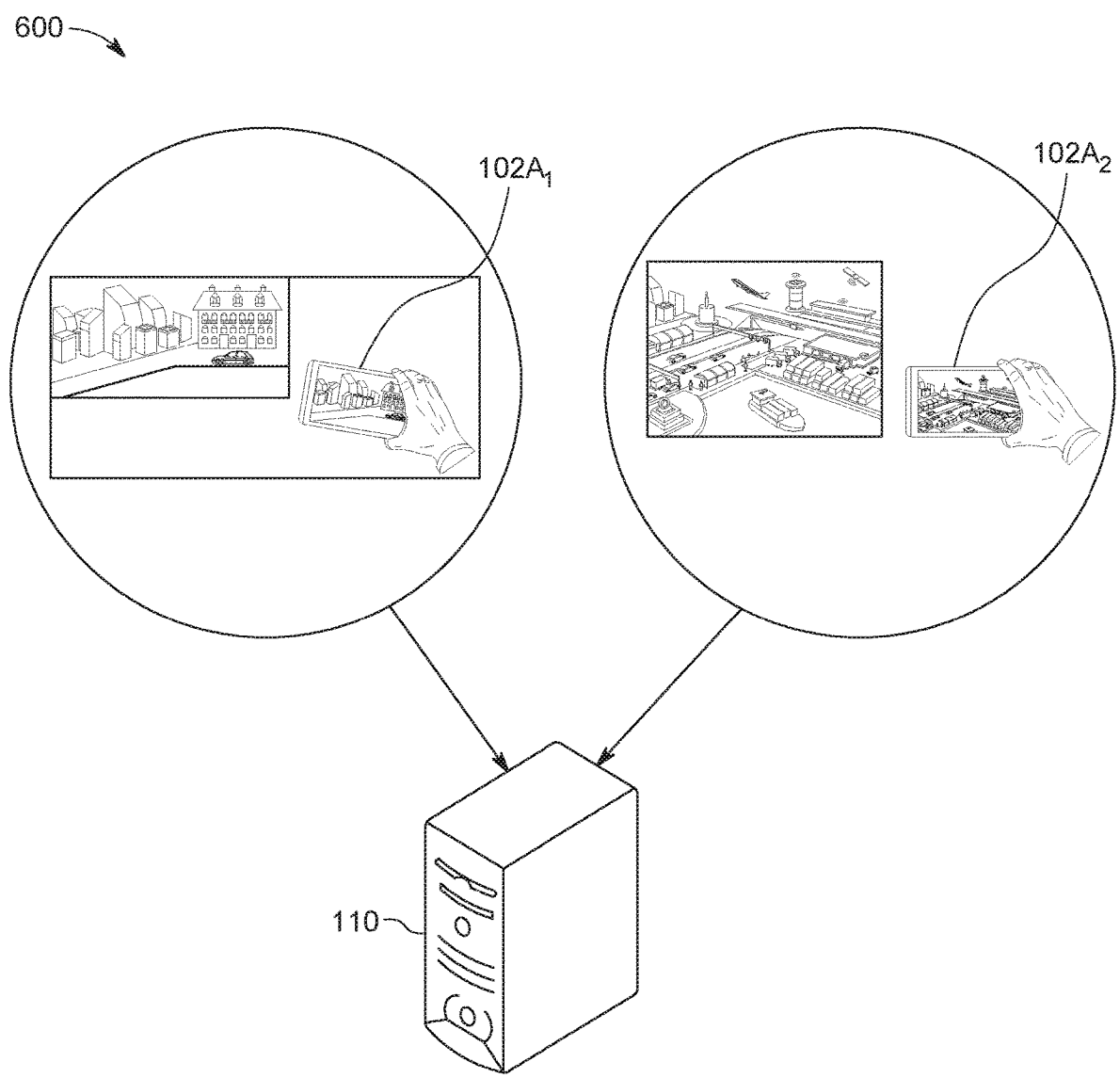
FIG. 6 shows a block diagram of in transit image capture in accordance with some embodiments.

FIG. 6 shows a block diagram of in transit image capture in accordance with some embodiments. With reference to FIGS. 1-6 mobile communication devices 102A1 and 102A2 may use image sensors to capture digital images of various target locations. Capture views 600 illustrate different perspectives of image capture scenarios for target locations.

While in transit within or on a vehicle 104, a mobile communication device 102A1, 102A2 may be aligned with an aperture, window, or opening of the vehicle, such that the image sensor 328 is directed toward and has a view of the target location. In some embodiments, the user may hold the mobile communication device 102A1. Positioning guidelines may be displayed on the display 340 to aid the user in obtaining the correct yaw, tilt, and roll of the mobile communication device 102A1 or 102A2. The positioning information may be provided by the remote server 110 in session information that is transmitted along with the reference image. This session information includes a variety of information about the previous capture session, including the positioning of the mobile communication device that captured the reference image. This session information (i.e. metadata) may be used by the crowdsourcing application 310 of the mobile communication device 102 to generate and display a guideline bounding box that the user can use to align the mobile communication device for image capture.

Once an image is captured by the image sensor 328, the image is preprocessed, as is described in greater detail with reference to FIGS. 17-20. Preprocessing occurs on the mobile communication devices 102A1 and 102A2 followed by a comparison of captured images against reference images to determine a set of change data. This change data is transmitted to the remote server 110 in order to minimize the transmission resources required to provide image update information to the remote server.

In order to ensure a mobile communication device 102A1 having a 7 megapixel image sensor can provide the same basic image quality that is obtained by a mobile communication device 102A2 with an a triple-camera array image sensor, the crowdsourcing application 310 may identify image sensor metadata for the installed image sensor 328. Identifying the make, model, type, aperture, and settings information for the image sensor may enable the mobile communication device 102A1 to load and apply a pre-defined image correction model on the mobile communication device. This image correction model can be thought of as a configuration setting, and serves to "smooth out" the image signals being processed on the mobile communication device by correcting and augmenting the image stream. The initialization and loading of the image correction model is done prior to travel and may occur without notifying the user or requiring intervention by the user, the image correction model may and only correct image data that is processed by the crowdsourcing application 310. Capturing an image outside of the crowdsourcing application 310 will not trigger correction with the image correction model.

The metadata for the current capture session is passed from the mobile communication device 102A1 to the remote server 110. Session information is captured by the mobile communication device 102 in-transit and may be stored in secure memory. The session information may be transmitted to the remote server 110 after termination of the travel, so that the session information can be compared against substitute travel information sources (e.g., automatic dependent surveillance broadcast, ADSB) to ensure accuracy. Accurate session information is stored by the remote server 110 in association with an updated reference image, generated using the recently captured image. The remote server 110 ma use the session information for image quality assurance, network health monitoring and statistical analysis.

In some embodiments, the mobile communication device 1021, 102A2 may be mounted on a gimbal device. The gimbal device may be automated and include circuitry for receiving instruction signals from the mobile communication device 102A1, 102A2. The instruction signals may be transmitted via NFC, BlueTooth, Wi-Fi or other short range wireless technology. The instruction signals may be control signals that cause the gimbal to move the mounting bracket, thereby adjusting the position of the mobile communication device 1021, 102A2. In this way, the image sensor 328 may be adjusted or positioned automatically once the mobile communication device 102A1, 102A2 is within image capture range of the target location.

Figure 7:
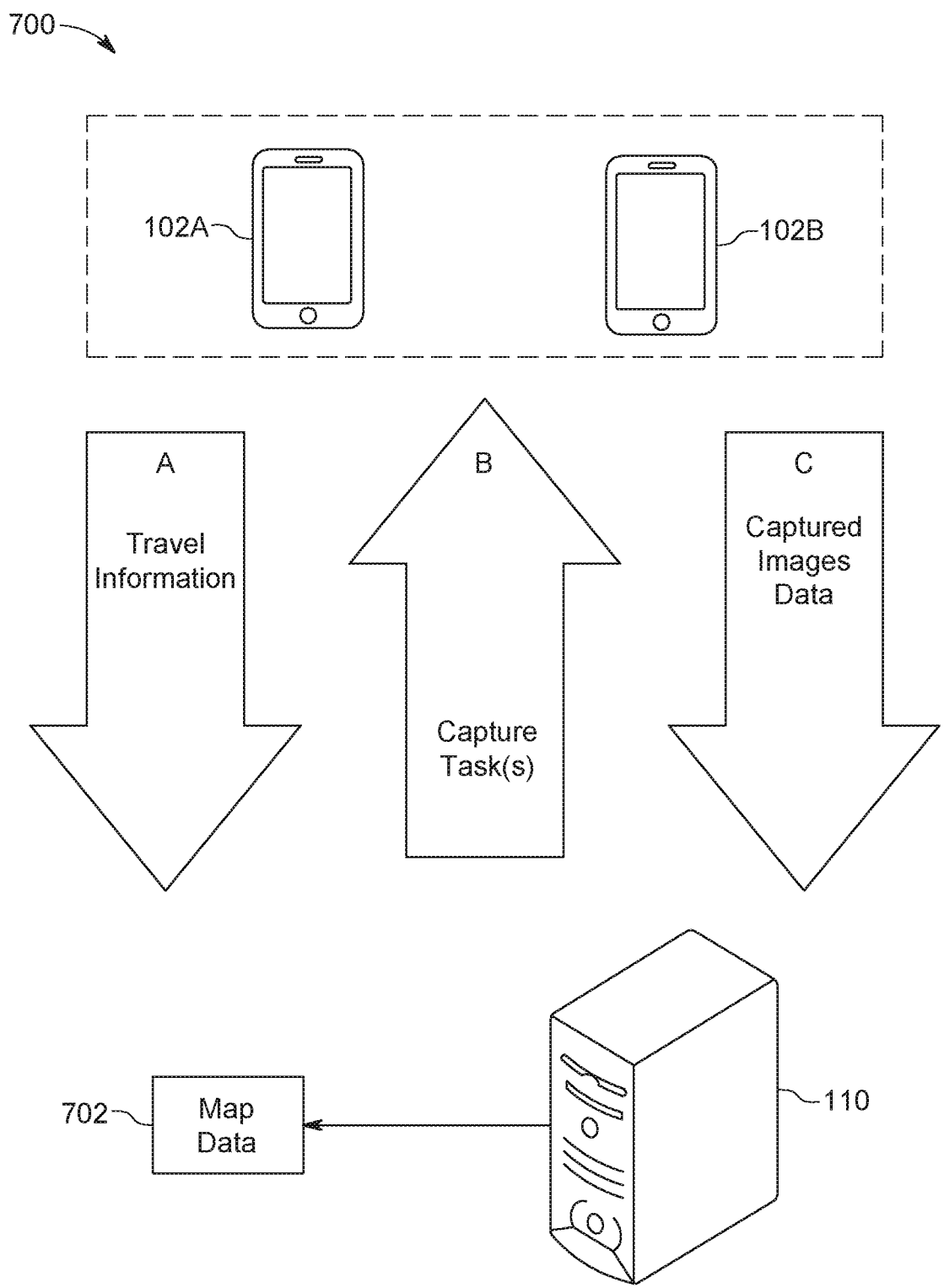
FIG. 7 shows an information flow diagram of data flow in a crowdsourced surveillance platform in accordance with some embodiments.

FIG. 7 shows an information flow diagram of data flow in a crowdsourced surveillance platform in accordance with some embodiments. With reference to FIGS. 1-7, the data flow 700 may include the passing of information between multiple mobile communication devices 102A, 102B, and the remote server 110. At any point in time, a varying number of mobile communication devices, such as 102A and 102B may be transmitting data to or receiving data from the remote server 110.

Each user of the crowdsourced surveillance platform provides the remote server with travel information every time the user would like to be considered for new task assignments. Travel information can include the date and time of travel, the carrier, the route number, flight number, seta assignment, boat name, or other means of identifying a specific travel journey. The user may enter this information via a user interface of the crowdsourcing application 310 on a mobile communication device 102A, 102B. The information is transmitted to the remote server for task assignment and scheduling.

Tasks may be assigned by the remote server 110 based, at least in part on the received travel information, as will be discussed in greater detail with reference to FIGS. 11-16. Travel information may be used by the remote server 110 to identify those mobile communication devices 102 that will pass within image capture range of a target location while on their travel journey. In this way, the remote server 110 assigns tasks by matching travelling users of the crowdsourcing application 310 with the surveillance needs of platform clients. Clients have previously submitted a coordinate grid, such as a pentagon grid, indicating the boundaries of a location for which surveillance is desired. Travel information is compared against map data 702 to identify possible matches. Tasks are generated for matched users. The generated tasks B are transmitted to the mobile communication devices 102A, 102B of matched users.

Once users capture the images proscribed in assigned tasks, data associated with those images (i.e., change data) is transmitted from the mobile communication devices 102A, 102B has captured images data C. The remote server 110 may use this change data to update map data 702 and generate new reference images. Thus, reference images and map data are undergoing constant revision, modification, and updating as new images are captured and tasks are completed by users.

Figure 8:
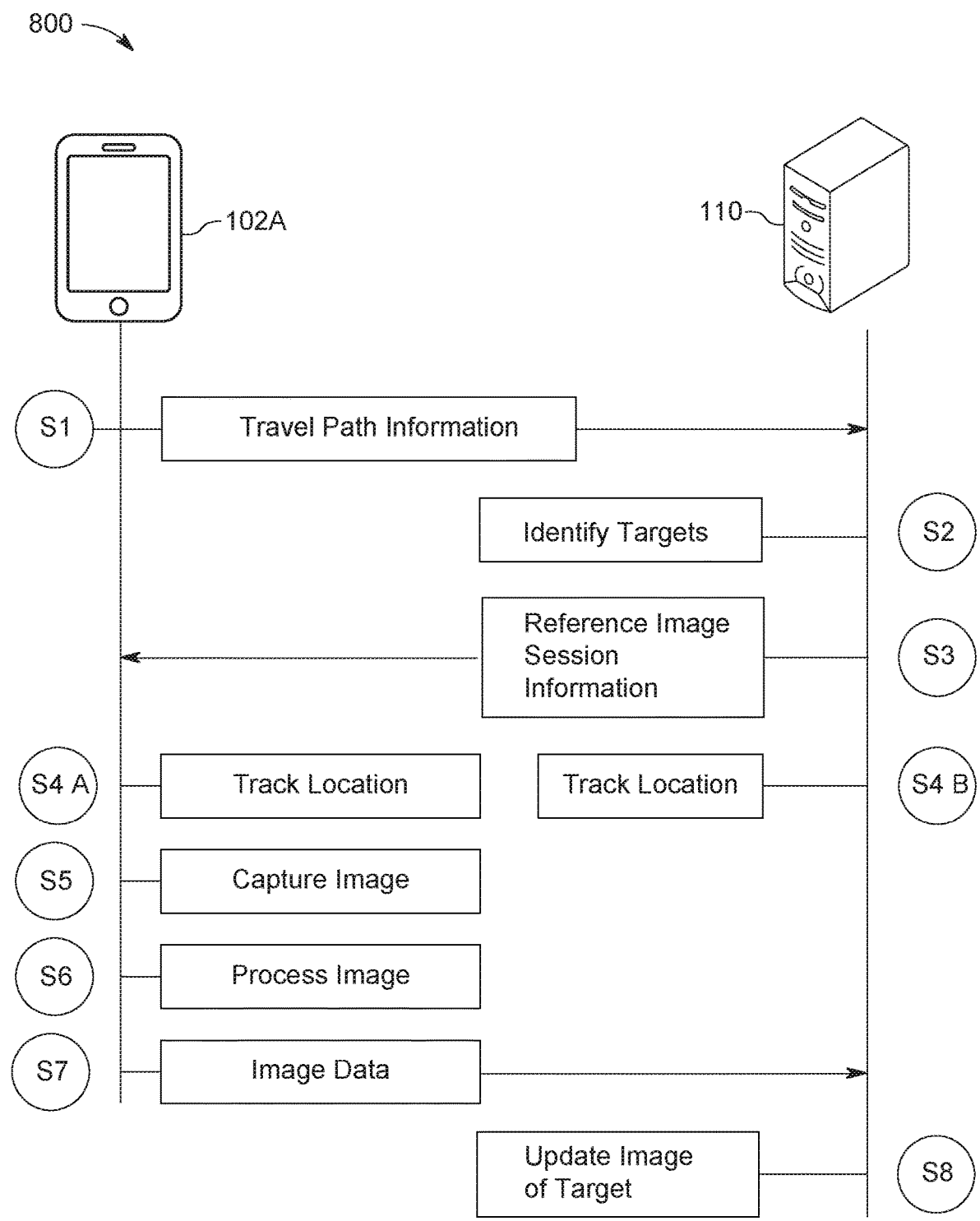
FIG. 8 shows a call flow diagram of crowdsourcing surveillance image capture in accordance with some embodiments.

FIG. 8 shows a call flow diagram of crowdsourcing surveillance image capture in accordance with some embodiments. With reference to FIGS. 1-8, the call flow 800 illustrates the order of actions between the mobile communication device 102A and remote server 110. This call flow 800 represents exemplary communications between an individual mobile communication device 102A and the remote server 110.

At step S1, the mobile communication device 102A may transmit travel path information to the remote server 110. The travel path information may be entered via a user interface of the crowdsourcing application 310 sing I/O interface 324. At step S2, the remote server 110 may use the travel path information to identify target locations lying along an estimated path of travel. The remote server 110 may estimate the travel path and, or obtain estimated travel path information from a third party information sources, using path planning module 518.

At step S3, the remote server 110 may transmit a task and, or a reference image and session information for the capture session of the reference image. In some embodiments, the task assignment may be sent with the reference image and the session information. In other embodiments, the reference image and session information are sent just before departure of the vehicle 104 along the travel journey. Additional metadata may be included with the reference image. This metadata may include location information indicating the GPS coordinates of a target location associated with the reference image. The receiving mobile communication device 102A may reject or accept the task assignment using task scheduler module 312. If accepted, the task will be added to a queue in the crowdsourcing application 310 and a task acceptance message will be transmitted to the remote server 110. Information related to tasks, reference images, metadata (including session information) may be stored in secure storage in memory 302 to reduce the likelihood of exposure of the reference image and metadata to malicious actors.

At step S4, once the departure time is reached, the mobile communication device 102A may begin tracking its position and progress along the travel path. The remote server 110 may begin tracking or monitoring progress of the mobile communication device 102A via occasional update messages from the mobile communication device 102A and, or substitute travel information such as that provided by ADSB or other travel information sources. As the vehicle 104 progresses along a travel path, the mobile communication device 102A may communicate with a GPS satellite 108 at regular intervals in order to determine its position. The path tracking module 316 may receive the GPS coordinate updates and compare the current position of the mobile communication device 102A against stored task information. Specifically, the current position of the mobile communication device 102A is checked against the GPS coordinates delineating the beginning and end of the portion of the travel path in which the user is within image capture range of the target location. That is, the portion of the travel path that is within image capture range of the target location may be considered to be a threshold distance from the target location. Although the actual distance from the target location may vary along this portion of the travel path, all points along the path segment are equal to or less than the threshold distance from the target location. Path tracking module 316 monitors the mobile communication device 102A's position as it relates to this threshold distance and initiates image capture upon determining that the mobile communication device is not positioned within the threshold distance, i.e., within the portion of the travel path lying within range of the target location. The crowdsourcing application 310 may transmit updates to the remote server 110 including current position information. These updates may be provided using the access point 240. For example-in-transit Wi-Fi may be used to transmit status updates.

At step S5, the image sensor 328 of the mobile communication device 102A may capture an image of the target location. The mobile communication device 102A may be positioned either manually or on a mounting, to capture an image through a window, aperture, or opening in the vehicle. Capture is initiated once the path tracking module 316 detects that the mobile communication device 102A is within the threshold distance of the target location based, at least in part, on a comparison of current position to the threshold distance and path segment nearest target location. Initiation of image capture may result in the display of an image capture user interface such as a smartphone camera application interface. A guideline or guide box may be overlaid on the screen to provide the user with guidance on positioning of the mobile communication device 102A. Alternatively, the initiation of image capture may result in the transmission of n instruction signal to an automated gimbal to adjust positioning of the mounted mobile communication device 102A.

At step S6, the mobile communication device 102A may pre-process the captured image using image processing module 314. The captured image may be processed using the image correction model to remove or account for the effects of weather patterns, time of day lighting, vehicle window specifications, and, or the specifications of the mobile communication device 102A image sensor 327. The preprocessed image may then be orthorectified and the resulting modified image may be compared to the reference image to identify differences between the two images. Those pixels that differ between the two images are stored as a set of change data. At step S7, the image data, i.e., the set of change data, is transmitted back to the remote server 110. At step S8, the remote server 110 may use the set of change data to update the reference image for the target location.

Figure 9:
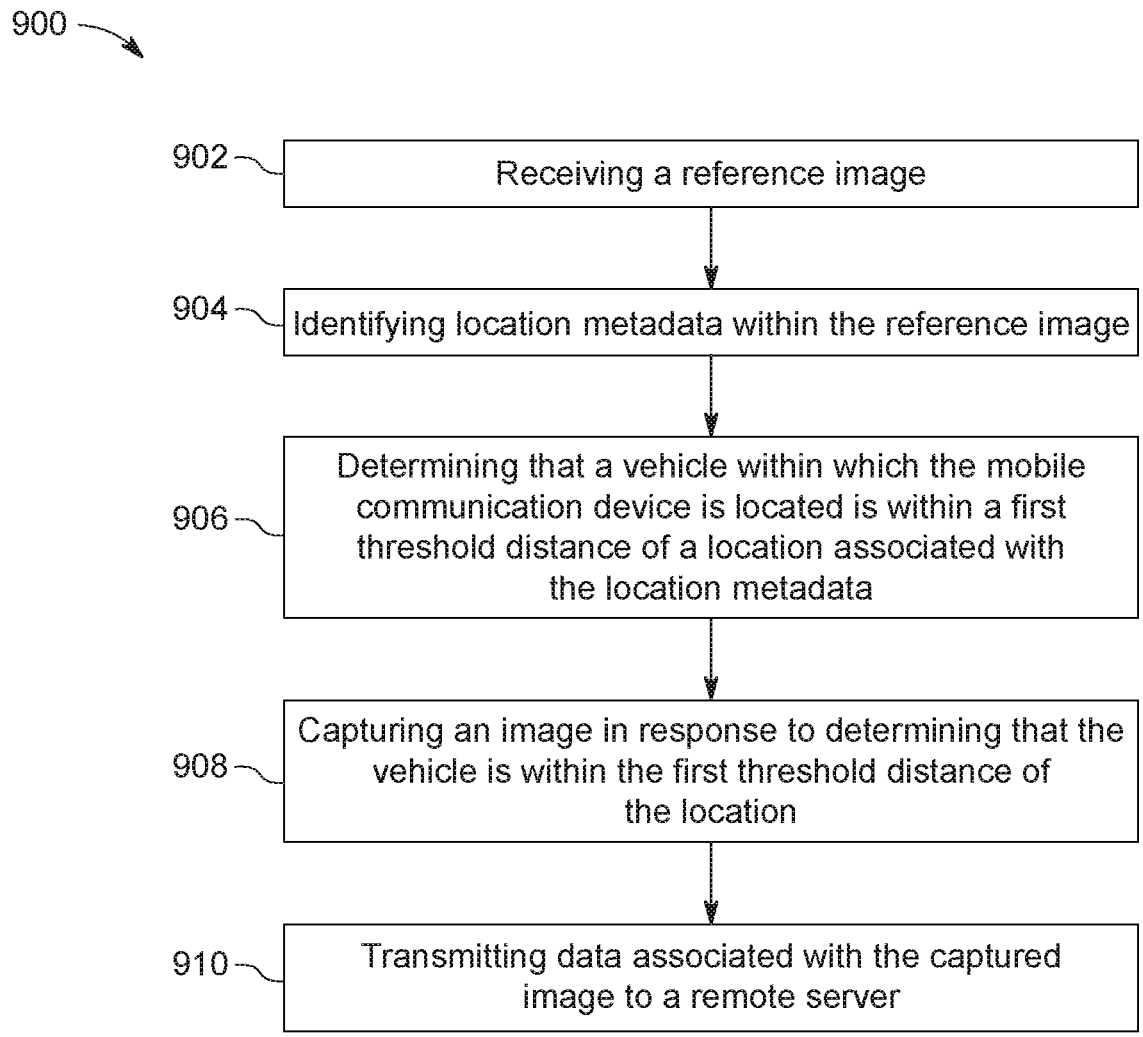
FIG. 9 shows a process flow diagram of an exemplary method of crowdsourcing surveillance image capture on a mobile communication device in accordance with some embodiments.

FIG. 9 shows a process flow diagram of an exemplary method of crowdsourcing surveillance image capture on a mobile communication device in accordance with some embodiments. With reference to FIGS. 1-9, the method 900 illustrates techniques for mobile communication device 102 image capture in a crowdsourced surveillance platform.

In block 902, a transceiver of the mobile communication device 102 may receive a reference image from the remote server 110. That is, the communication interface 320 of the mobile communication device 102 may receive and pass to the crowdsourcing application 310, a reference image and metadata associated with the task to which the reference image belongs. The task handler module 312 may be passed the reference image and metadata and may store them in a secure memory (i.e. part of memory 302) in association with the task, such as by storing the received data in association with the task identifier.

In block 804, the processor 326 of the mobile communication device 102 may identify location information with then reference image and, or metadata. That is, the task handler module 312 may analyze the received reference image for image embedded metadata, as well as the received metadata, to identify the grid coordinates, or a single coordinate, of the target location.

In block 906, the processor 326 of the mobile communication device 102, may determine that a vehicle 104 within which the mobile communication device 102 is located is within a first threshold distance of a location associated with the location metadata. That is, the path tracking module 316, may monitor the position of the mobile communication device 102 and alert the crowdsourcing application 310 when the mobile communication device 102 is within the threshold distance of the target location. This may include a notification occurring when the mobile communication device 102 is within the threshold distance of the grid coordinates, or the single coordinate of the target location. The path tracking module 316 may use the metadata to identify the beginning and end of a portion of the travel path that is within range of the target location, and may provide the alert or notification as soon as this portion of the travel path is entered.

In block 908, the image sensor 328 of the mobile communication device 102 may capture an image in response to determining that the vehicle is within the first threshold distance of the location. That is, the path tracking module 316 may notify the crowdsourcing application 310 and, or the task handler module 312 that the mobile communication device 102 is within the first threshold distance of the target location. Upon notification, the task handler module 312 may signal to the crowdsourcing application 310 to display the image capture user interface in preparation for image capture. The crowdsourcing application 310 may optionally provide a notification to the user such as an alert sound or vibration, to notify the user that image capture is ready. Once the image sensor 328 is in position, the image sensor 328 may capture an image of the target location.

The captured image may be preprocessed on the mobile communication device to adjust for the effects of time of day lighting, weather, window specifications, and image sensor specifications, as well as the roll, tilt, and yaw, of the image sensor 329 during capture. The modified image may be compared against the reference image to obtain change data indicating the differences between the two images. This comparison may be a pixel-by-pixel comparison. The set of change data may be stored in secure storage in memory 302 in association with the task.

In block 910, the transceiver of the mobile communication device 102, may transmit data associated with the captured image to the remote server 110. That is, the communication interface 320 may transmit the set of change data to the remote server 110 via the access point 240 and, or the Core Network 220.

The selection of a transmission modality by the wireless communication device 102, may depend upon regional communications regulations. For example, if the vehicle 104 is an aircraft or a marine vessel, regulations constraining the use of different communication protocols may apply. Thus, the crowdsourcing application 310 may receive and, or store a second threshold distance representing a distance associated with a regulatory constraint. For example, the second threshold distance may be a distance from the ground, land, or communication tower that the mobile communication device must be within, in order to utilize the core network 220 or other networks. In the case of air travel, the second threshold distance may be an altitude, below which, cellular communications are permitted, and above which the access point 240 must be used for communications. Because regulations may change from region to region or based on travel modality, the second threshold distance may be updated regularly or as needed via transmission from the remote server 110. If neither the access point 240 nor the core network 220 is available to the mobile communication device 102, then change data and updates may be stored in the secure storage of memory 302 in a compressed format until the mobile communication device 102 is able to connect to a network. At no point does the user have access to the raw or compressed images obtained during the course of travel, or the change data. If internet connectivity is available in-transit, the change data is uploaded to the remote server 110 immediately after preprocessing. The upload/stream process may be opportunistic and subject to available bandwidth competes for throughput with other access point 240 users.

Figure 10:
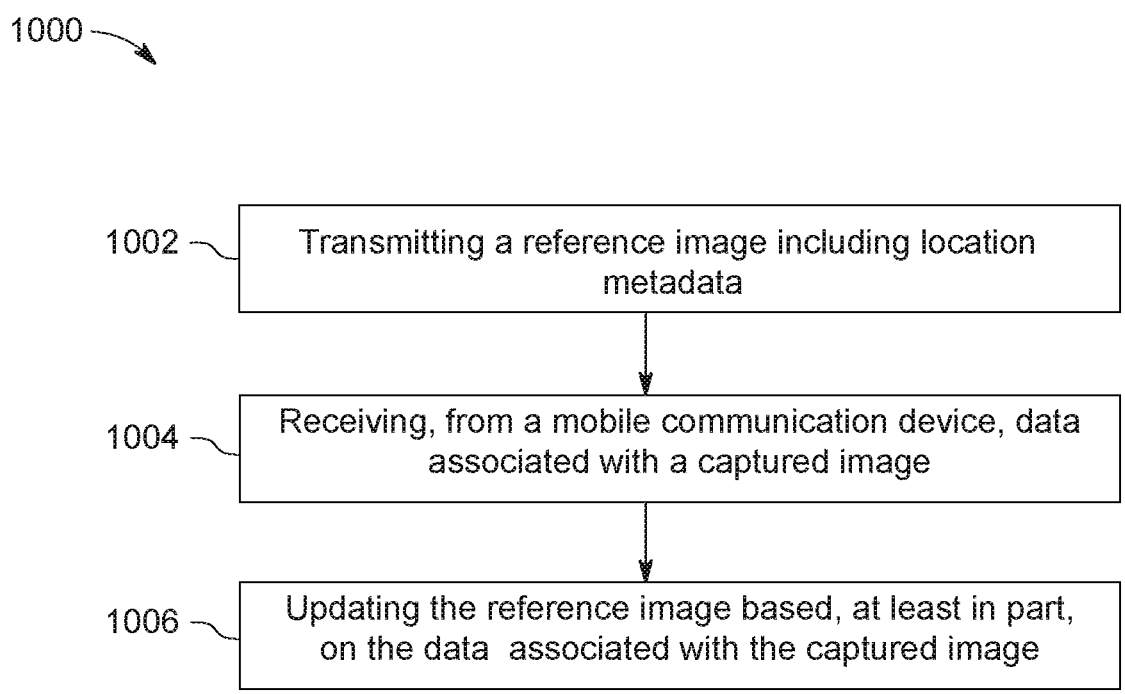
FIG. 10 shows a process flow diagram of an exemplary method of crowdsourcing surveillance image capture via a remote server in accordance with some embodiments.

FIG. 10 shows a process flow diagram of an exemplary method of crowdsourcing surveillance image capture via a remote server in accordance with some embodiments. With reference to FIGS. 1-10, the method 1000 illustrates techniques implemented on the remote server 110 to provide crowdsourced surveillance using captured images.

In block 1002, the transceiver of the remote server 110 may transmit a reference image and associated metadata to one or more mobile communication devices 102A, 102B, 102C. That is, the communication interface 522 may transmit reference images and metadata associated with assigned tasks to one or more mobile communication device 102 within the crowdsourced surveillance platform. The metadata may include session information and location information, enabling the user of the receiving mobile communication device 102 to capture an image of the specified target location.

In block 1004, the transceiver of the remote server 100, may receive captured image data and associated metadata from the one or more mobile communication devices 102A, 102B, 102C. That is, communication interface 522 may receive any number of captured images from participating mobile communication devices 102A, 102B, 102C. The captured images data may be the change data. The change data may be of the same target location, such as when multiple users are on the same aircraft. The change data may also be of different target locations, such as when one user is on a boat, and another is on a bus. The received metadata may provide information about a capture session for the captured image.

In block 1006, the processor 526 of the remote server 110 may update the reference image, based, at least in part, on the captured image data and metadata. That is, the mapping module 514 may receive the captured image and metadata from the mobile communication device 102, and may use the set of change data to update the reference image. The mapping module 512 may compare the change data to the reference image to rebuild the captured image. This rebuilt captured image may be stored as the new reference image for the target location. The metadata may be stored in association with the new reference image as session formation. If many users are assigned the same capture task, then the reference image may be updated many times in one day.

In this way, reference images may be updated with a controllable degree of granularity and regularity according to the needs of a client.

III. Task Scheduling Based on Travel Path

The crowdsourced surveillance platform leverages known transit routes such as flight paths, waterways, highway and road systems to determine which users will be within image capture range of target locations, for which surveillance has been requested by a client. The intended travel plans of platform users can be used to obtain an estimated travel path from the known travel routes. And this estimated travel path compared against existing target locations in the region of travel to identify possible matches. Target locations lying along the estimated travel path and within the threshold distance are potential capture tasks. In this way, the crowdsourced surveillance platform uses travel paths as a means of task identification and scheduling.

Figure 11:
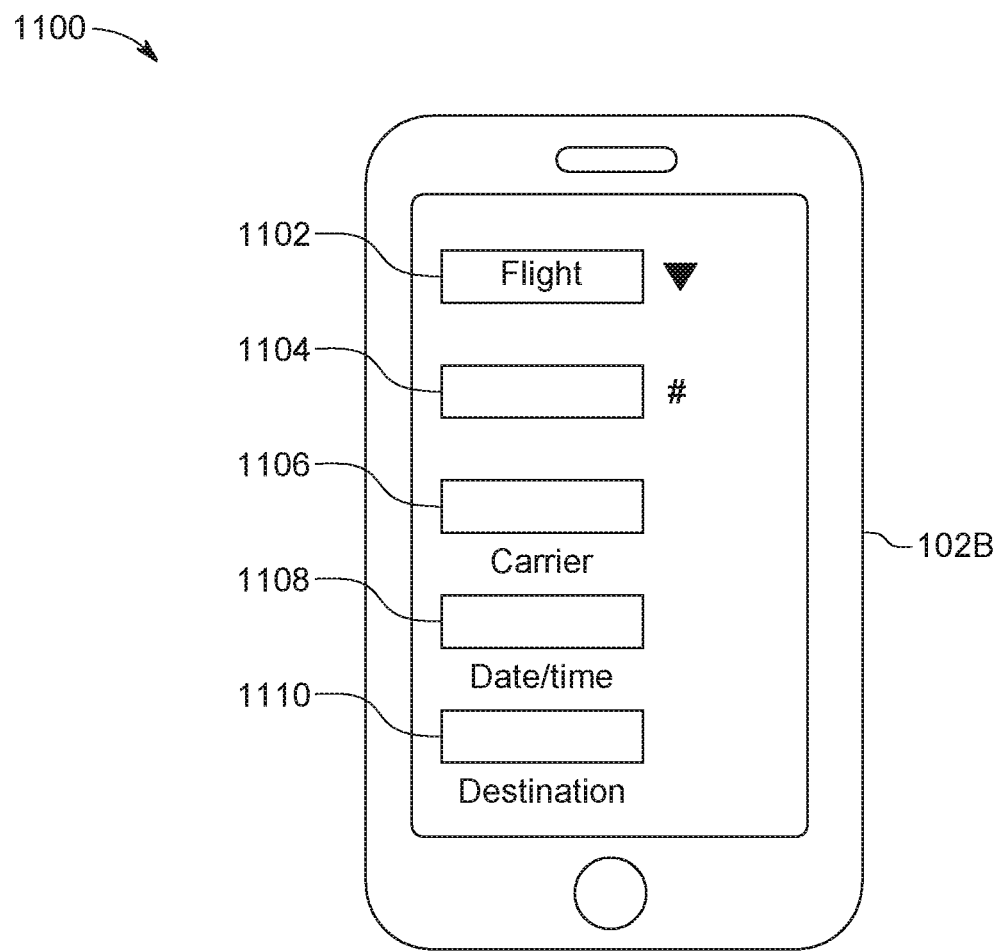
FIG. 11 shows a block diagram of a travel path information user interface for a mobile communication device in accordance with some embodiments.

FIG. 11 shows a block diagram of a travel path information user interface for a mobile communication device in accordance with some embodiments. With reference to FIGS. 1-11, the user interface 11 is an exemplary travel information input screen for a mobile communication device 102. Additional entry fields may be provided to increase the granularity and, or specificity of travel information that may be captured by the crowdsourcing application 310.

The user interface 1100 has a number of input fields 1102-1100 enabling the use to enter information about an upcoming travel journey. A travel mode field 1102 record input about the type of vehicle 104 that the user will be travelling in or on for this portion of the travel journey. The travel mode field 1102 is shown as a drop-down box in which the mode "flight" is selected. Other modes may include boat, train, bus, car, helicopter, or other. A vehicle identifier field 1104 records input about the number or identifier of the vehicle 104 in which the user will travel. For example, a flight number, a cruise ship name, a boat name, a train route, or the like, may be used to identify the vehicle, and, or a known travel path. Similarly, the carrier field 1106 may record input about the carrier or travel provider for the travel journey. Carriers may be airlines, cruise operators, train operators, ferry operators, etc. The date and time of departure may be captured in a date field 1108.

The destination field 1110 records input about the user's festination for this portion of the journey. In some embodiments, different portions of the journey may need to be entered separately in order to generate task assignments for different portions of the journey. For example, a user flying to Dallas, with a layover in Baltimore, may enter travel information for the flight to Baltimore, and may also enter travel information for the flight to Dallas. This may enable the remote server 110 to review the estimated flight path of both portions of the journey to identify tasks. Other embodiments may include the submission of a single set of travel information, with only the final destination as input. However, these embodiments may result in follow up questions being prompted for user input, such as questions about stop overs, layover length, etc.

Other fields, not shown here, may include a departure city, port, address, or the like. Another field may be a seat assignment field. Seat assignment information may be checked against vehicle model information supplied my external sources, to determine whether the user will have a view of the target location from where they are seated. For example, a user with an aisle seat on an airplane may not be assigned a task unless they confirm that the window seat is empty, allowing them access to the window. Additional fields may be used, depending on the travel information desired for estimation of a travel path.

Figure 12:
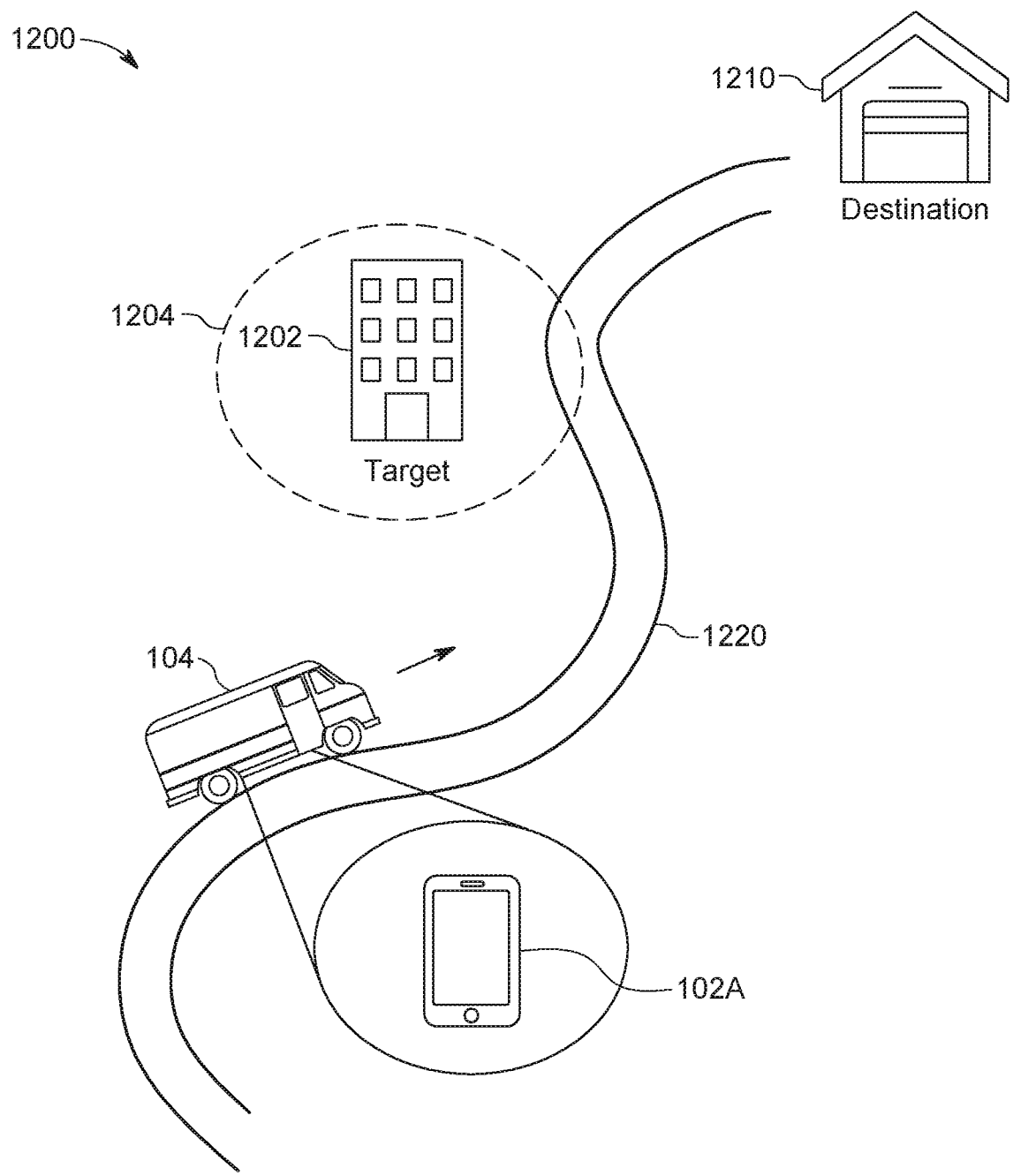
FIG. 12 shows a block diagram of a vehicle in which a mobile communication device is located, travelling along a travel path toward a destination in accordance with some embodiments.

FIG. 12 shows a block diagram of a vehicle in which a mobile communication device is located, travelling along a travel path toward a destination in accordance with some embodiments. With reference to FIGS. 1-12, a travel journey 1200 is shown in which a user of a mobile communication device 102A is travelling within a vehicle 104, a bus, along a road 1220. The destination 1210 lies at the end of the road 1220.

A target location 1202 may lie along the road 1220 and thus may be reviewed by the remote server 110 as a possible capture task. The remote server 110 may calculate or obtain the distance between the target location 1202 and the road 1220 to determine if any portion of the road lies within an image capture range 1204 of the target location. In the travel journey 1200, a portion of the image capture range 1204 overlaps the road 1220 indicating that for this portion of the travel journey, the image sensor 328 of the mobile communication device 102A should be able to capture an image of the target location 1202. The two points of initial overlap with the border of the road may mark the beginning and end of the portion of the travel path that lies within image capture range 1204. Thus, the portion of the travel path, i.e., the road 1220 lying between these two points is within the threshold distance. Upon reaching the first point of overlap, the path tracking module 316 of the mobile communication device 102A may notify the task handler module 312 and crowdsourcing application 310 that image capture should commence.

In various embodiments, a mobile communication device 102A may receive multiple capture tasks for the same travel journey. This may include multiple capture tasks for the same flight, the same ferry ride, the same train ride, as well as multiple capture tasks over different portions of the travel journey. These tasks may be queued within the crowdsourcing application 310 and displayed in a task queue interface in an order of capture opportunity appearance. That is, the capture task associated with the first target location to be reached, will appear first or at the top of the queue. Thus the task queue may organize capture tasks in order of appearance or order of opportunity for completion.

Figure 13:
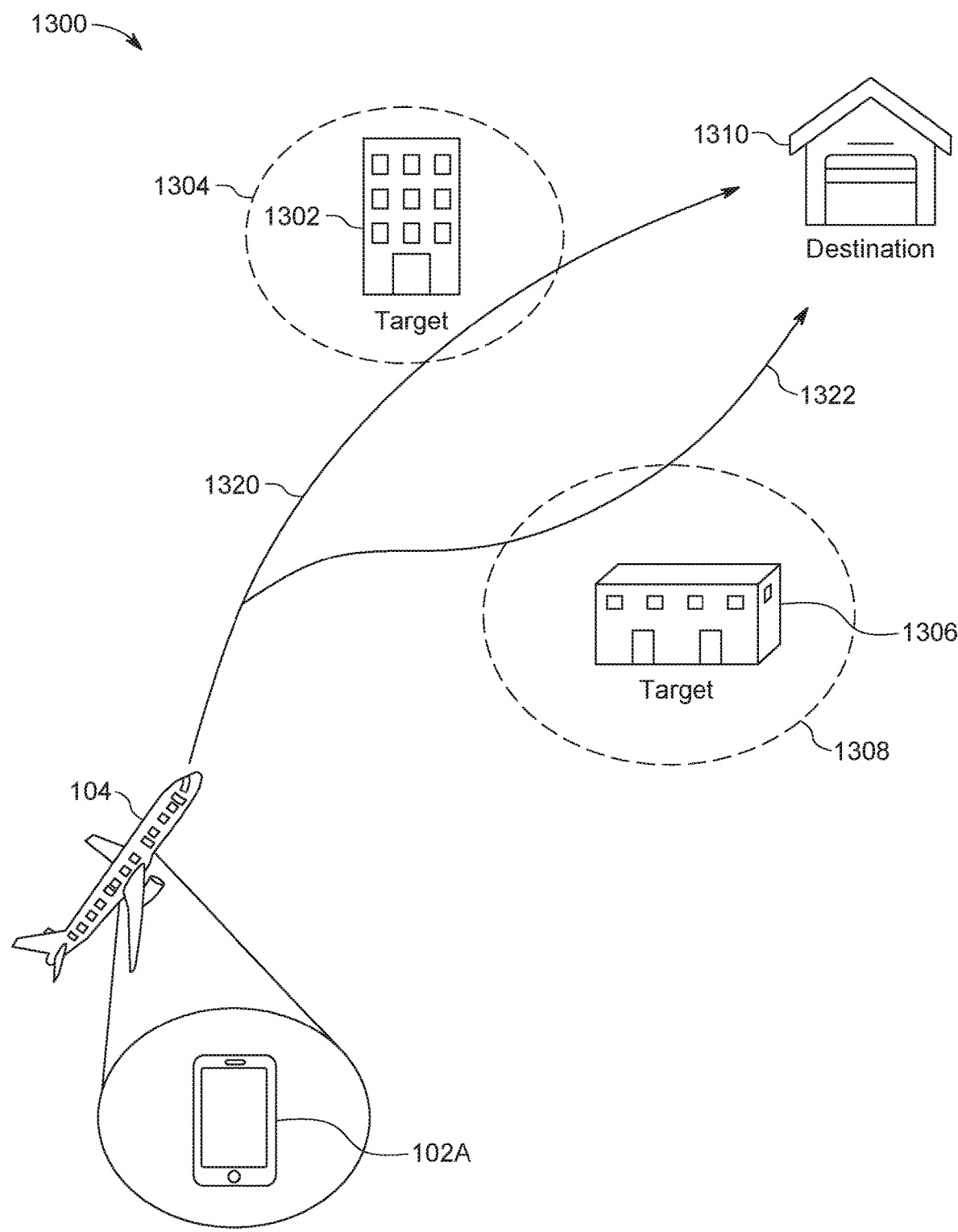
FIG. 13 shows a block diagram of a vehicle on an adjusted travel path and adjusted image capture targets in accordance with some embodiments.

FIG. 13 shows a block diagram of a vehicle on an adjusted travel path and adjusted image capture targets in accordance with some embodiments. With reference to FIGS. 1-13, the travel journey 1300 illustrates the release of unperformable tasks and acquisition of new tasks due to travel path course deviation.

The travel journey 1300 includes a vehicle 104, an aircraft, in which the mobile communication device 102A is located travelling along a first flight path 1320 to a destination 1310. The mobile communication device 102A has the assigned task of capturing an image of target location 1302. The target location 1302 has an image capture range 1304 that overlaps the first flight path 1320. That is, the mobile communication device 102A has been tasked with capturing an image of the target location 1202 while the mobile communication device 102A is positioned within the portion of the flight path 1320 that overlaps the image capture range 1304.

While the vehicle 104 is in transit, the path tracking module 314 may communicate with a GPS satellite 105 via communication interface 320 to obtain position information. Substitute travel information sources, such as ADSB may be used to obtain position information while in transit, if GPS is unavailable. This position information may be compared to an estimated travel path provided by remote server 110 and, or substitute travel information sources. For example, the path tracking module 314 may also communicate with substitute travel information sources via the access point 240, in order to obtain flight path information. The estimated travel path information, regardless of source, may be compared against the position information obtained from the position information to determine if the vehicle 104 is "on course" and remains within an accessible deviation of the estimated travel path. If the position of the mobile communication device 102A deviates from the estimated travel path beyond the threshold deviation, which may be time or distance, the path tracking module 314 may notify the crowdsourcing application 310 and may transmit a status update message to the remote server, indicating the deviation. Similarly, if the mobile communication device 102A receives an updated travel path from the substitute travel information source, the path tracking module 314 may use this new estimated travel path to determine whether the target location 1302 will still be within image capture range 1304 during a portion of the new travel path, i.e. second flight path 1322. If so, then the path tracking module 314 may update the coordinates for the beginning and end of the portion of the travel path in which the mobile communication device 102A will be in image capture range. If the target location 1302 will no longer be within image capture range 1304 of any portion of the new flight path 1322, then the mobile communication device 102A may transit a task cancellation message to the remote server 110 as part of a status update message.

The remote server 110 may track the progress of vehicle 104 using substitute travel information such as estimated travel path, altitude, depth, velocity, ma speed, etc. The remote server may receive an updated travel path from the substitute travel information, or via a status update message from the mobile communication device 102A. The remote server 110 may compare new travel path, i.e. second flight path 1322 to target locations in the region to identify possible new capture opportunities. For example, the remote server 110 may search a database of target locations to identify GPS coordinates lying within an image capture range of the second flight path 1322. The target location 1306 has an image capture range 1308 that did not overlap the first flight path 1320, but does overlap the second flight path 1322. Thus, the remote server 110 may generate a new task associated with target location 1306 and may transmit the task, the reference image, and metadata to the mobile communication device 102A for task acceptance or rejection. If the user of the mobile communication device 102A accepts the new task, then the mobile communication device 102A will capture an image of target location 1306 upon entering the image capture range 1308.

In some embodiments, the tasks can be cancelled both by the task handler 312 of the mobile communication device 102A and the task handler module 512 of the remote server 110. Tasks cancelled by the mobile communication device 102A, i.e., by task handler module 312 may remain in a task queue of the crowdsourcing application 310 with an inactive status. If the user decides that he or she would like to rejoin the capture task, for reasons such as a change in weather that previously prohibited image capture, or a change in travel path that will bring the mobile communication device 102A back within image capture range 1304, then the mobile communication device 102A may transmit a task acceptance message to the remote server 110 to accept the task again.

Figure 14:
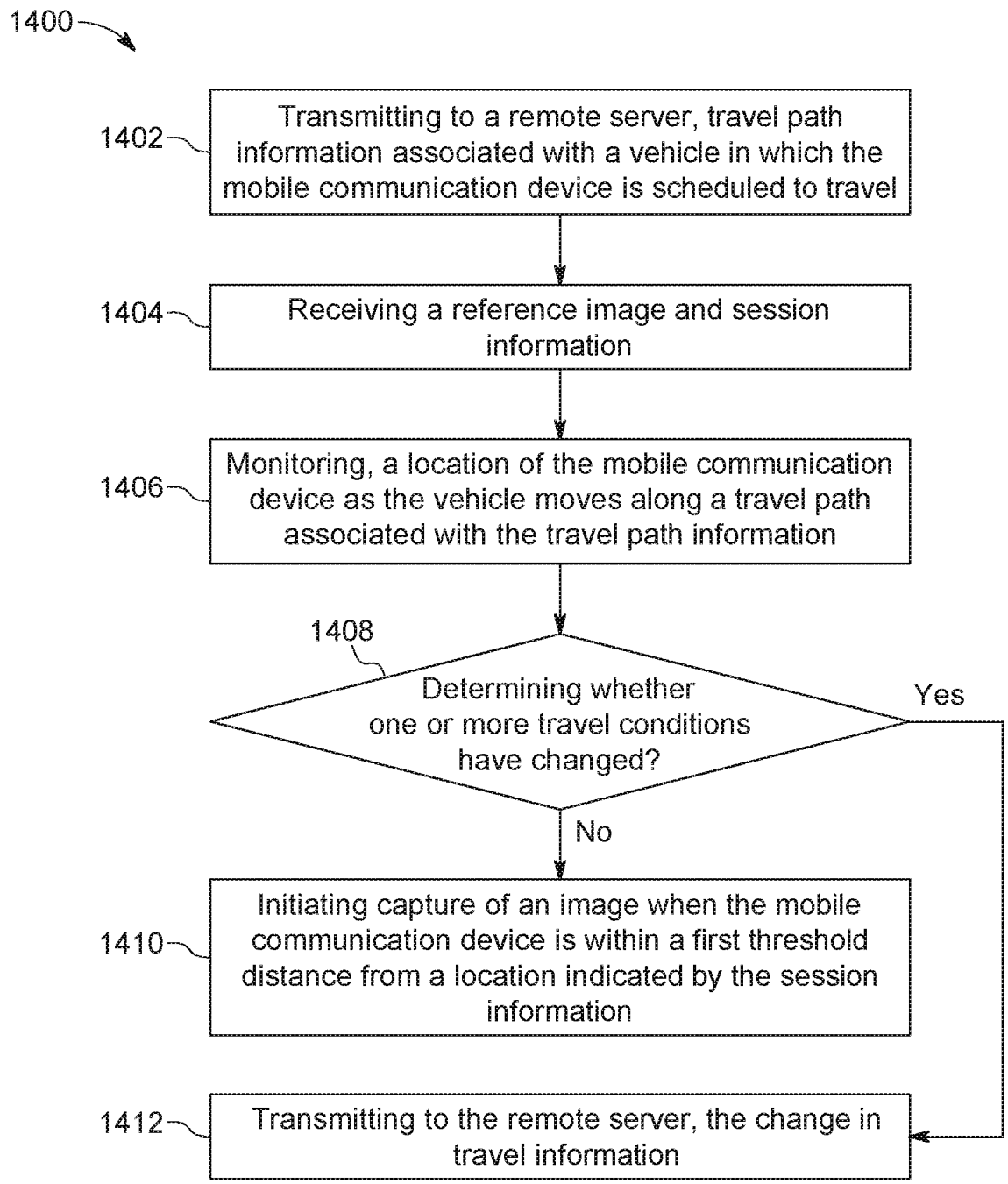
FIG. 14 shows a process flow diagram of an exemplary method of scheduling mobile communication device surveillance image capture based on travel path information in accordance with some embodiments.

FIG. 14 shows a process flow diagram of an exemplary method of scheduling mobile communication device surveillance image capture based on travel path information in accordance with some embodiments. With reference to FIGS. 1-14, the method 1400 illustrates techniques for using a mobile communication device 102 to implement travel path based task scheduling of image capture.

Once a user opens the crowdsourcing application 310 they may be prompted to enter their travel information (e.g., flight # and seat #). The flight number is used to retrieve the estimated travel path from the FlightAware API (or similar), and the altitude and speed during each phase of travel. The task handler module 512 of the remote server 110 then identifies high-value image targets based on the estimated travel path, and caches the coordinate data and the most recent reference image of the target on the device. Because GPS receivers operate normally in Airplane mode, the cached coordinates are compared against the current coordinate readout from the GPS module in a continuous manner in order to alert the user when image capture should begin. This provides clear, consistent image capture in the event onboard internet connectivity is unavailable.

In block 1402, the transceiver of the mobile communication device 102 may transmit to the remote server 110, travel information associated with a vehicle 104 in which the mobile communication device 102 is scheduled to travel. That is, the communication interface 320 may transmit the travel information provided via user interface 1100 to the remote server 110. This travel information may be provided in a task request message or other message format and may be received by the task handler module 512, via the communications interface 522.

In block 1404, the transceiver of the mobile communication device 102 may receive, from the remote server 110, a reference image and session information, wherein the session information includes metadata from a capture session of the reference image, and wherein the received reference image is selected by the reference server and based, at least in part, on the travel path information. That is, the communication interface 320 of the mobile communication device 102 may receive a reference image and metadata including session information from the remote server 110. The remote server 110 may have selected the reference image and metadata, and the associated task, based on a review of the travel information. This selection may include selection based, at least in part, on travel path, speed of the vehicle 104, depth of the vehicle 104, predicted weather pattern, seat assignment, or altitude of the vehicle 104 associated with the travel path information. There may be a review of the estimated travel path by the path planning module 518. If the path planning module 518 determines that a target location associated with the reference image lies along the estimated travel path and within image capture range of the estimated travel path, then the task handler module 512 may generate a task and assign it to the user. The task, the reference image, and the metadata including the session information are then transmitted by communication interface 522 to the mobile communication device 102.

In block 1406, the mobile communication device 102 may monitor a location of the mobile communication device 102 as the vehicle 104 moves along a travel path associated with the travel path information. That is, the path tracking module 316 of the mobile communication device 102 may communicate with a GPS satellite 106 and or a substitute travel information source via the access point 240 to monitor the position of the mobile communication device 102. This position may be regularly checked against an estimated travel path in order to: 1) determine the position of the mobile communication device 102 relative to the target location; and 2) determine whether the vehicle 104 is on course or deviating from the estimated travel path.

In block 1408, the mobile communication device 102 may determine whether travel conditions have changed. That is, the path tracking module 316 may communicate with substitute travel information sources via the access point 240 to obtain information about changes in travel path, deviation from the current travel path, and weather pattern changes.

In block 1410, the mobile communication device 102 may initiate capture of an image when the mobile communication device 102 is within a first threshold distance from a location indicated by the session information. That is, if the path tracking module 316 does not detect a change in the travel conditions, then the path tracking module 316 may determine when the position of the mobile communication device 102 has reached the beginning of a portion of the travel path in which the mobile communication device 102 is within the image capture range and may notify the task handler module 312 and crowdsourcing application 310. The crowdsourcing application 310 may optionally alert the user that it is time to capture an image. The task handler module 312 may open an image capture user interface and overlay a guideline or guide box on the interface to aid the user in aligning the image sensor 328 to capture the image.

In block 1412, the transceiver may transmit a message to the remote server, indicating the change in travel conditions. That is the communication interface 320 may transmit a status update message to the remote server 110 indicating the nature of the change in travel conditions. In the event that the vehicle 104 deviates from the travel path beyond a deviation threshold in time or distance, the remote server 110 may use the task handler module 518 to assign a new task to the mobile communication device 102A. The remote server 110 may transmit a new task assignment, a new reference image, and a new set of metadata including session information for the new reference image. The process may return to block 1402 to receive this information and may proceed through 1400 accordingly. Similarly, if the weather patterns predicted for the travel journey change, the remote server 110 may generate and send a new task, reference image, and metadata. Both the remote server 110 and the mobile communication device 102 may determine changes in weather using substitute travel information such as the National Oceanographic and Atmospheric Administration (NOAA) weather data. As such, either device may cancel a task based on changes in weather patterns, or request a new capture task be performed based on these changes.

Figure 15:
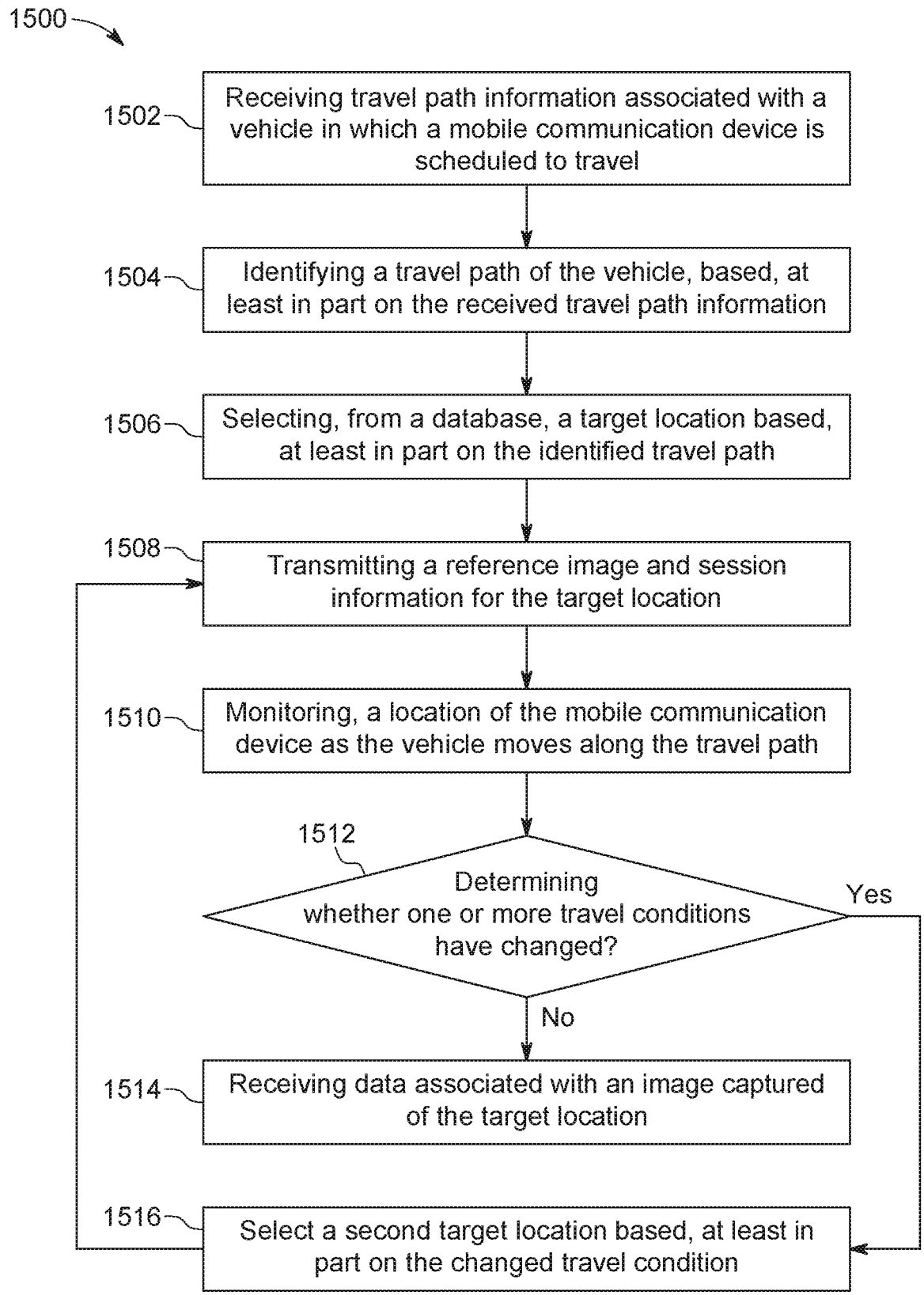
FIG. 15 shows a process flow diagram of an exemplary method of scheduling, by a remote server, surveillance image capture based on travel path information in accordance with some embodiments.

FIG. 15 shows a process flow diagram of an exemplary method of scheduling, by a remote server, surveillance image capture based on travel path information in accordance with some embodiments. With reference to FIGS. 1-15, method 1500 illustrates techniques for using a remote server 110 to implement travel-path based task scheduling for image capture.

In block 1502, the transceiver of the remote server 110 may receiving travel information associated with a vehicle in which a mobile communication device is scheduled to travel. That is, communication interface 522 of the remote server 110 may receive travel information submitted by a mobile communication device 102.

In block 1504, the remote server 110 may identify a travel path of the vehicle, based, at least in part on the received travel information. That is, the processor 526 may review the travel information, an estimated travel path. The estimated travel path may be obtained from substitute travel information sources providing information about known travel paths, or form travel path planning applications and websites.

In block 1506, the remote server 110 may select, from a database, a target location based, at least in part on the identified travel path. That is, the task handler module 512 may select one of the target locations laying along an estimated travel path. The task handler module 512 may consider the estimated travel path, weather patterns, seating assignment of the user, the time of day, the speed of the vehicle, the altitude or depth of the vehicle, etc. and may determine whether an opportunity exists to capture an image of a target location. A capture opportunity exists where the travel path intersects with an image capture range around a target location. However, capture opportunities may be limited by time of day lighting, weather patterns, and various aspects of travel. The path planning module 518 and the task handler module 512 may determine whether these additional factors will negatively impact the usefulness of any images captured for the target location. Any target locations lying along the travel path and not overly negatively impacted by additional factors, may be used to generate and assign a capture task.

In lock 1508, the transceiver of the remote server 110 may transmit a reference image and session information for the target location. That is, the communication interface 526 of the remote server 110 may transmit the reference image and metadata including session information for each selected target location. This data is provided as part of or after task assignment.

In block 1510, the remote server 110 may monitor a location of the mobile communication device 102 as the vehicle 104 moves along the travel path. That is, the processor 526 may use communication interface 522 to communicate with substitute travel information sources to check the vehicle's progress along an estimate travel path. Using speed, depth, and altitude information provided by the substitute travel information source, the processor 522 can use path planning module 518 to assess progress of the vehicle 104.

In block 1512, the remote server 110 may determine whether one or more travel conditions have changed. That is, the processor 526 may use task handler module 512 and path planning module 518 to monitor weather patterns, change to travel paths, and any status updates received from a mobile communication device 102. If a travel path changes during the travel journey, or if weather patterns shift, some target locations may no longer be visible from the vehicle 104, making it difficult or impossible to capture images.

In block 1514, the transceiver of the remote server 110 may receive data associated with an image captured of the target location in response to determining that travel conditions have not changed. That is, if no changes in travel conditions are detected in block 1512, then the mapping module 514 may receive change data from the mobile communication device 102 via the communication interface 522.

In block 1516, the remote server 110 may select a second target location based, at least in part on the changed travel condition. That is, the task handler module 512 and the path planning module 514 may identify new capture task opportunities based on the travel changes. The travel changes may be considered to be an updated set of travel information, upon which a review of the estimated travel path and the additional conditions may be performed. Once new target locations are selected the method may return to block 1508 and proceed accordingly.

IV. Mobile Communication Device Sensor Analysis

Different mobile communication devices 102A, 102B, 102C may have different environmental sensor capabilities. This may impact the quality and type of data that can be collected in association with an image capture session. In order to ensure that necessary data can be collected for a capture session, a sensor gap analysis may be performed prior to travel, in order to determine whether substitute sources of sensor data must be obtained for the capture session.

Prior to travel, the crowdsourcing application 310 of the mobile communication device 102 may poll for the system status and capabilities of any available sensors 330 from a known list. For example, the processor 328 may determine whether the mobile communication device 102 is not equipped with a barometer or the barometer is not functioning. In such a case, the mobile communication device 102 may rely on open source ADSB data or other substitute travel information source to supplement the missing data for inferring altitude. This data may be used to determine the resolution of the captured images. Mobile communication device gap analysis and the loading of the image correction model may be steps that occur when the user first initializes the crowdsourcing application 310 after installation.

The crowdsourcing application 310 may perform the sensor gap analysis by polling the system itself, such as by reviewing properties list (plist) files for sensor settings. This may be a simple "heartbeat" check in which sensors are pinged in order to obtain a simple reply to indicate that the sensor is active. If either the plist file indicates that the sensor is missing or inactive, or the ping receives no reply, then the crowdsourcing application 310 may seek substitute data sources to supply environmental information. Alternatively, the mobile communication device 102 may simply notify the remote server 110 of the sensor capabilities deficit, and the remote server 110 may obtain relevant data after the image is captured. For example, the remote server 110 may use the timestamp of an image capture session to obtain ADSB data for that time period and determined altitude, speed, location, etc.

Figure 16:
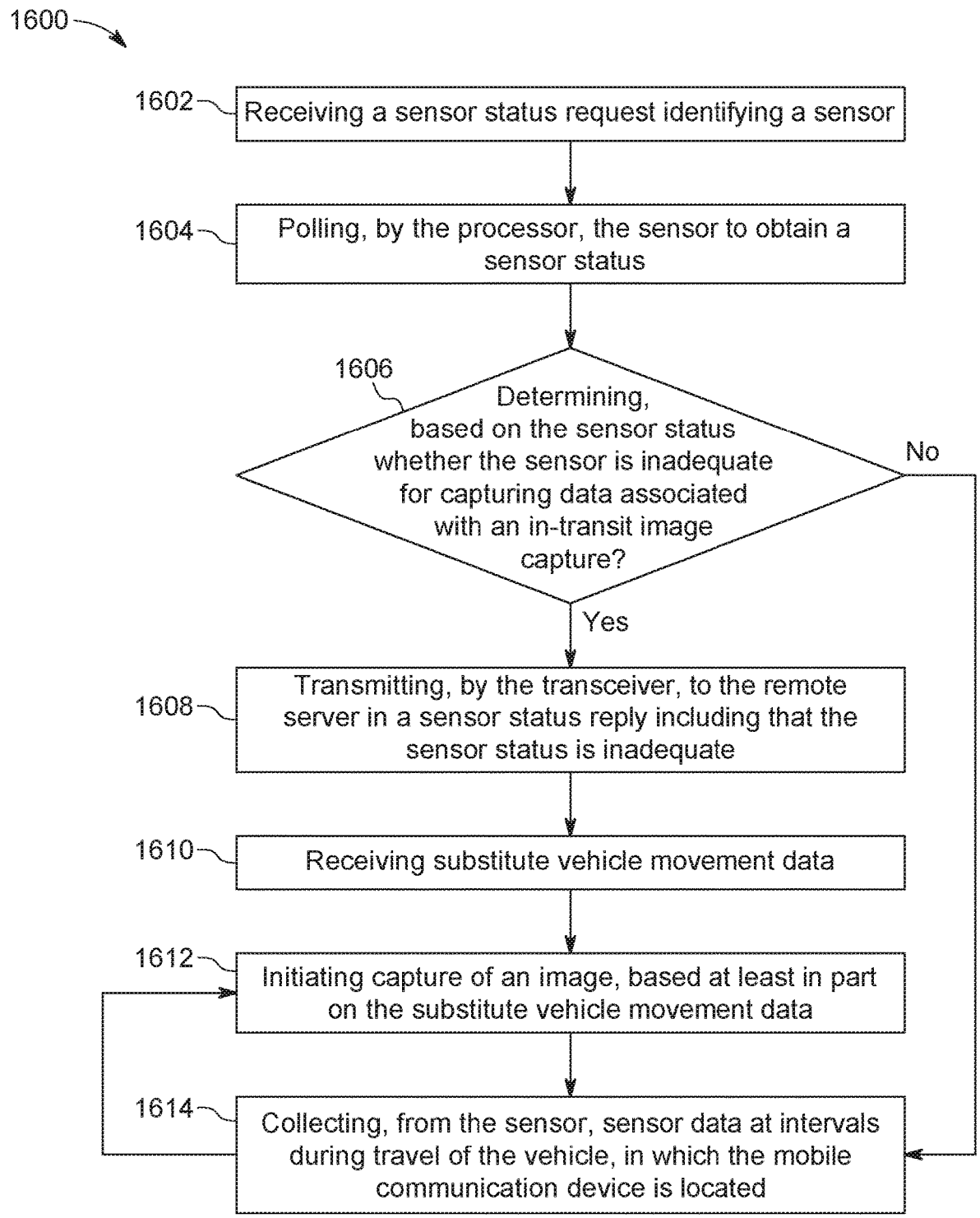
FIG. 16 shows a process flow diagram of an exemplary method for accounting for sensor deficiencies in a mobile communication device in accordance with some embodiments.

FIG. 16 shows a process flow diagram of an exemplary method for accounting for sensor deficiencies in a mobile communication device in accordance with some embodiments. With reference to FIGS. 1-16, the method 1600 may enable a mobile communication device 102 to perform a sensor gap analysis in preparation for image capture.

In block 1602, the transceiver of the mobile communication device 102 may receive from the remote server 110, a sensor status request identifying a sensor for which status is requested. That is the crowdsourcing application 310 may receive a sensor status request message via the communication interface 320. The sensor status request message may indicate one or more sensors for which the remote server would like to receive data, i.e. session information.

In box 1604, the mobile communication device 102 may poll the sensor to obtain a sensor status. That is, the processor 326 may poll one or more sensors 330 indicated in the sensor status request message to determine if the sensors 330 are active. The processor 326 may review a system file and or ping the sensors directly to obtain a response. In block 1606, the mobile communication device 102 may obtain based on the sensor status whether the sensor is inadequate for capturing data associated with an in-transit image capture. That is, the processor 326 may determine whether the sensor are inactive or not.

In block 1608, in response to determining that the sensor status is inadequate, the transceiver of the mobile communication device 102 may transmit to the remote server in a sensor status reply including that the sensor status is inadequate. That is, the communication interface 322 of the mobile communication device 102 may transmit a sensor status replay message indicating that one or more of the sensors 330 are inactive or otherwise inadequate for capturing session information during a capture session.

In block 1610, the transceiver of the mobile communication device 102 may receive from the remote server, substitute vehicle movement data, wherein the substitute vehicle movement data includes data about the movement of a vehicle in which the mobile communication device will be traveling. That is, the communications interface 322 of the mobile communication device 102 may receive the substitute vehicle movement data, which may be substitute travel information as described above.

In block 1612, the mobile communication device 102 may initiate capture of images by the image sensor 328. That is, the crowdsourcing application 310 via task handler module 312 may initiate an image capture session. The substitute data or other sensor data may be collected as part of the session information for the capture session.

In block 1514, in response to determining that the sensor status is adequate, the mobile communication device 102 may collect, from the sensor, sensor data at intervals during travel of the vehicle 104, in which the mobile communication device 102 is located. That is, the processor 326 may collect data from sensors 330 at regular intervals and throughout a capture session. The method may proceed to block 1612 for image capture.

V. Mobile Communication Device Sensor Analysis

Mobile communication devices 102A, 102B, 102C may have different image sensor capabilities. Image sensors of different mobile communication devices may be of a different make, model, aperture, and may also have different settings. In order to ensure consistent image quality in a crowdsourced surveillance platform, images may need to be normalized to account of variations in image sensor capabilities. Further adjustment may need to be made to account for differences in orientation, placement and positioning of image sensors when capturing an image.

During a capture session, the orientation of the mobile communication device 102 may be used to provide positional feedback to the user via the device accelerometer/gyroscope. Each mobile communication device's image sensor angle may vary based on the position of the image sensor(s) relative to the body of the mobile communication device 102. This information may be determined during the gap analysis process and, or as part of image correction model loading. During a capture session, the display 240 may provide a guideline or guide box around the edge of the screen when the mobile communication device to aid in alignment of the image sensor with respect to the target location. As the mobile communication device 102 is repositioned on or near the window, the guide box may transition to a different color or disappear when the correct orientation is established and vice-versa if the correct orientation is lost.

The crowdsourcing application 310 maintains control of the image sensor 328 properties and may adjust itself to optimize image capture based on the altitude, atmospheric conditions, scene properties, and device capabilities. This includes, but is not limited to, utilizing both optical and digital zoom, increasing or decreasing shutter speed and frame rate, activating wide angle lenses, and adjusting the exposure. Once an image is captured, the image's Exchangeable image file format (EXIF) metadata may be parsed from the image file. EXIF is a standard that specifies the formats for images, sound, and ancillary tags used by digital image sensors, scanners and other systems handling image and sound files. Mobile communication devices 102A, 102B, and 102C that have enabled geotagging of images capture this data by default. Because each mobile communication device's sensor data was pre-fetched during gap analysis and, or image correction model loading, the only EXIF property needed during a capture session is coordinate values.

Once an image is captured, it is stored in a secure storage within memory 302, referenced, and compared to the reference image of the target location, which was received by the mobile communication device 102 prior to travel. On-device analysis provides a mechanism for preliminary image alignment, object detection, and visual differentiation. Basic object detection is performed by packaging a pre-trained coreML model within the crowdsourcing application 310, then classifying and labeling the scene as framed by the image sensor. Once the images have completed the pre-processing phase, they are overwritten or otherwise discarded in memory 302 and do not persist anywhere on the mobile communication device 102.

Figure 17A:
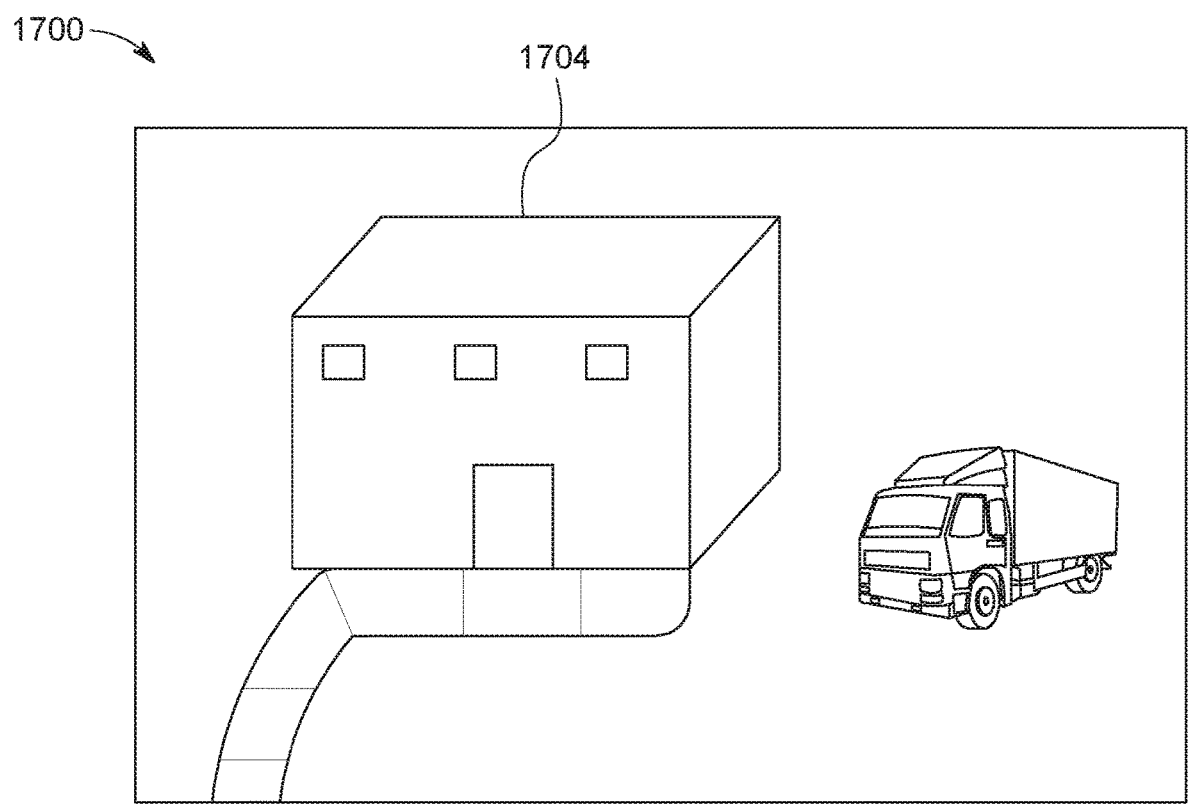
FIG. 17A shows a block diagram of an aerial surveillance image captured from a first camera perspective in accordance with some embodiments.
Figure 17B:
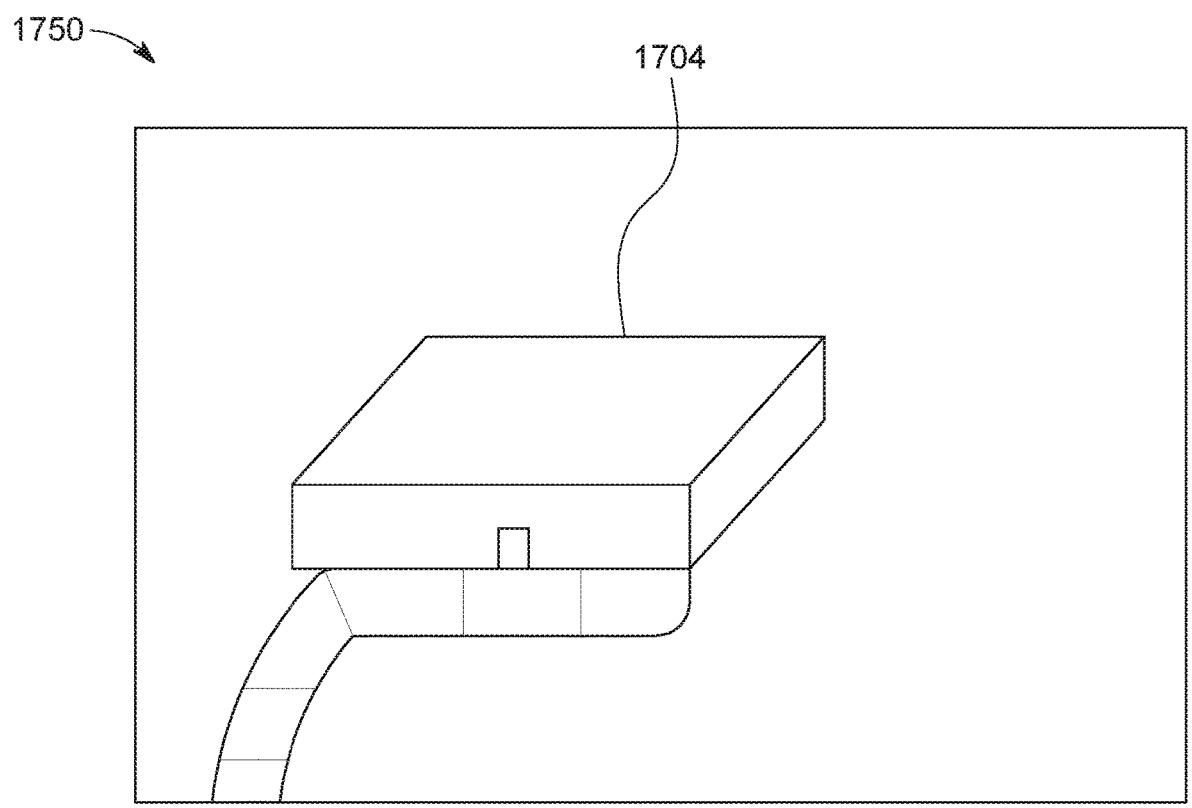
FIG. 17B shows a block diagram of an aerial surveillance image captured from a second camera perspective in accordance with some embodiments.
Figure 18:
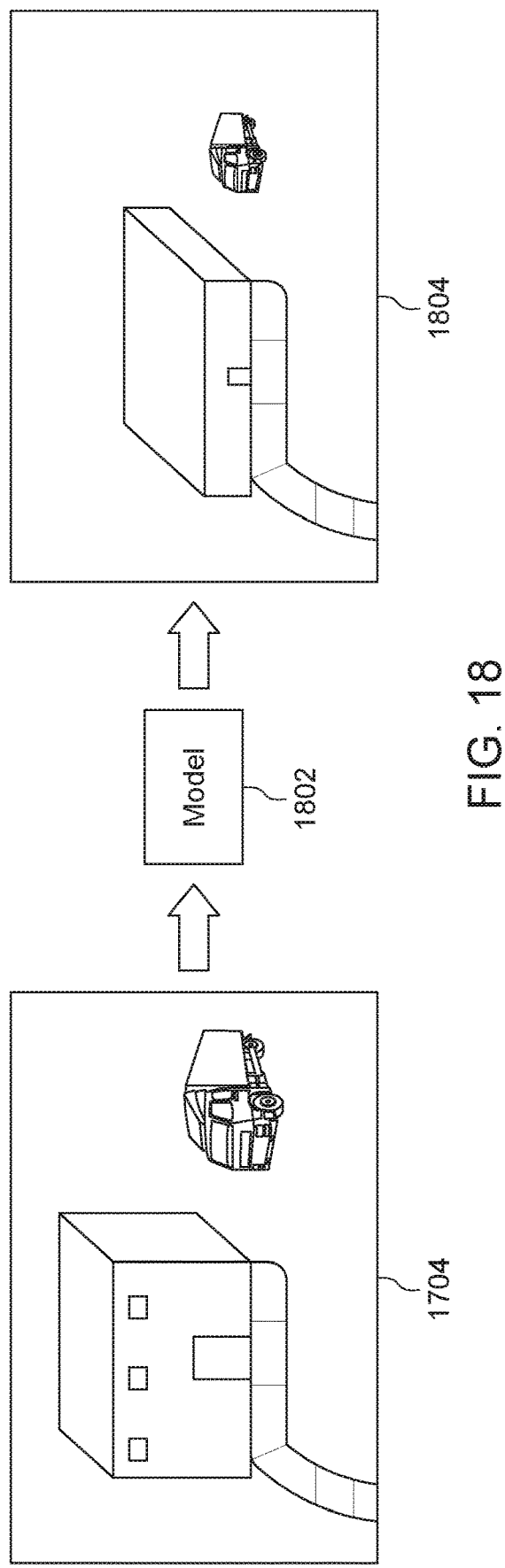
FIG. 18 shows a block diagram of an aerial surveillance image corrected to correspond to a reference image in accordance with some embodiments.

FIGS. 17A and 17B show block diagrams of aerial surveillance images captured from a first camera perspective and a second camera perspective in accordance with some embodiments. With reference to FIGS. 1-17B, the scene 1700 may represent a captured image 1704 of a target location, in which the image as captured with a mobile communication device 102A. The scene 1750 may be captured with a different mobile communication device 102B, and may present the target location in a captured image 1708 in a different perspective or zoom. The first captured image 1704 illustrates a vehicle parked near the target location, while captured image 1708 of the same target location does not include the vehicle. This difference may appear in the set of change data resulting from a comparison of the two captured images. Such differences may be useful in pattern of life or commerce analysis for a given target location. However, because these captures images 1704, 1708 were not captured with the same image sensor and image sensor settings, the resulting images do not feature the target location in the same manner. Thus, in order to perform an effective comparison of the captured images 1704, 1708 processing is needed to adjust for discrepancies in image sensor capabilities and position FIG. 18 shows a block diagram of an aerial surveillance image corrected to correspond to a reference image in accordance with some embodiments. With reference to FIGS. 1-18, the correction of an image in order to match image sensor settings and position as well as environmental factors is shown. Continuing the example of FIGS. 17A and 17B, the captured image 1704 may be a current image and captured image 1708 may be the reference image provided to the mobile communication device 102 prior to departure of the vehicle 104.

The first captured image 1704 was captured with an mobile communication device 102A having an image sensor on a different zoom setting, and tiled at a different pitch than the mobile communication device 102B that captured the reference image, captured image 1708. The combination of orthorectification and image correction during ingestion of the image can correct this problem. Specifically, by adjusting the pitch of the image sensor 326 to more closely match that of the image sensor that captured the reference image, the view of a target location can be modified to match that of a reference image.

Orthorectification is the process of removing the effects of image perspective (i.e., roll, pitch, and yaw) and relief (i.e., terrain) effects for the purpose of creating a planimetrically consistent image. The resultant orthorectified image has a constant scale in which features are represented in their 'true' positions. This allows for the accurate direct measurement of distances, angles, and areas (i.e. mensuration). Orthorectification requires 1) an image obtained with accurate sensor geometry; and 2) an elevation map for the ground surface appearing in the image.

During a capture session, image sensor 326 orientation data is obtained automatically and continuously by polling the accelerometer and gyroscope. This orientation information is collected and provide to the remote server in association with captured images. During task assignment and acceptance, image sensor orientation information for the last known capture session may be transmitted to the mobile communication device 102 along with the other metadata and session information. Orientation metadata from the reference image capture session may also be used to validate the orthorectified result as a part of the image quality assurance process in which the known values are compared against the corrected result.

After orthorectification of the captured image 1704 an image correction model 1802 is applied. The image correction model may be a set of image sensor settings, modifications, and adjustments and is generated or selected by the, model generation module 516 of the remotes server 110. Image sensor model, type, make, and settings, obtained during initial crowdsourcing application installation or during a gap analysis, may be transmitted to the remote server 110 and used by the model generation module 516. Prior to travel departure, the model generation module 516 may create a sensor profile, or list of settings that adjusts the settings of the image sensor to match those of a reference image. For example, the remote server 110 may view session information for the reference image of an assigned task, and may determine, based on the session information, the various settings and capabilities, such as aperture and focal length, of the image sensor with which the reference image was captured. The settings of the image sensor to which the current task is assigned can then be adjusted to more closely match those of the image sensor of the previous capture session, by applying the image correction model. Similarly, the image correction model may also correct for weather patterns, time of day lighting, speed of the vehicle from which the reference image was captured, and other environmental factors. If the model generation module 516 determines from the reference image session information that there as cloud cover, snow, rain, low lighting, dusk, dawn, or other environmental effects, then the image correction model can be created to include image sensor changes that will adjust for these environmental effects.

The image correction model 1802 may be generated at each portion of a travel journey. For example, if a user is flying from Mexico City to Vancouver, they may stop in San Francisco. A first image correction model would be generated for the flight from Mexico City to San Francisco. In San Francisco, the mobile communication device 102 may receive a new image correction model 1802 for the flight from San Francisco to Vancouver. The CoreML package included with the crowdsourcing application 310 of the mobile communication device 102 may be used to help train and refine the image correction model 1802.

In various embodiments, after application of orthorecitification and image correction model processing, a captured image 1804 may be modified to resemble the capture session of the reference image. The resultant image 1804 may be easily compared to a reference image in order to identify change data.

Figure 19:
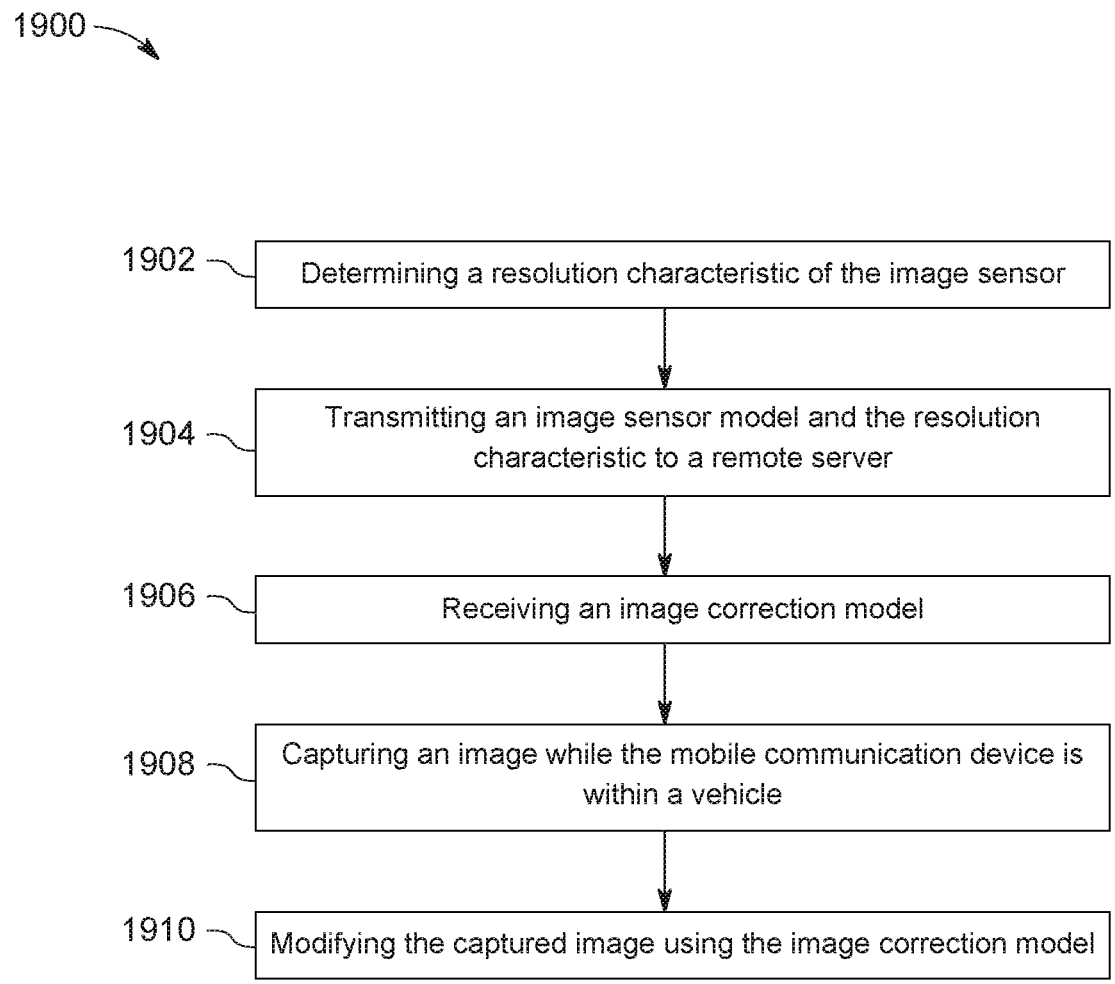
FIG. 19 shows a process flow diagram of an exemplary method for image correction based on image sensor information in accordance with some embodiments.

FIG. 19 shows a process flow diagram of an exemplary method for image correction based on image sensor information in accordance with some embodiments. With reference to FIGS. 1-19, the method 1900 may be implemented on a mobile communication device 102 to provide image correction of captured surveillance images. An image correction model may be generated and, or selected by the remote server 110 and transmitted to the mobile communication device 102 for use in correcting captured images.

In block 1902, the mobile communication device 102 may determine a resolution characteristic of the image sensor based, at least in part on image sensor model data stored in the memory. That is, processor 326 may review system files for an image sensor 328 of the mobile communication device 102 to identify at least one resolution characteristic for the image sensor 328. Resolution characteristic may be a specification, configuration, or settings of the image sensor 327.

In block 1904, the transceiver of the mobile communication device 102 may transmit an image sensor model and the resolution characteristic to a remote server 110. That is, the communication interface 320 may transmit the resolution characteristic and the image sensor model information to the remote server 110 for the purposes of obtaining an image sensor specific image correction model. In various embodiments, this may causes the remote server 110 to select an image correction model for the image sensor model based, at least in part on a comparison of the resolution characteristic to a resolution characteristic threshold as compared to the resolution characteristic of an image sensor from a prior capture session.

In block 1906, the transceiver of the mobile communication device 102 may receive from the remote server, an image correction model, wherein the image correction model is selected based at last in part on the image sensor model and the resolution characteristic. That is, the communication interface 320 may receive from the remote server 110 communication interface 522, an image correction model. The image correction model may have been selected or generated by the model generation module 516 based on the resolution characteristic, the image sensor model, and optionally, any environmental effects present during the last capture session. The image correction model may be selected or generated based on the model, and resolution characteristics of the image sensor that captured a reference image. More specifically, the image correction model may represent a model or profile that modifies the image sensor 328 to more closely match the capabilities of the image sensor used during the capture session of the reference image.

In block 1908, the image sensor 328 of the mobile communication device 102 may capture an image while the mobile communication device is within a vehicle. That is, the image sensor 328 of the mobile communication device 102 may capture an image of a target location associated with an assigned task.

In block 1910, the mobile communication device 102 may modify the captured image using the image correction model. That is, image processing module 314 of the mobile communication device 102 may apply the image correction model to the captured image to obtain a corrected image. This may include but is not limited to scaling the captured image to meet the resolution characteristic threshold; modifying the captured image to mitigate the visual effects of a weather pattern or a physical characteristic of terrain appearing in the captured image.

Figure 20:
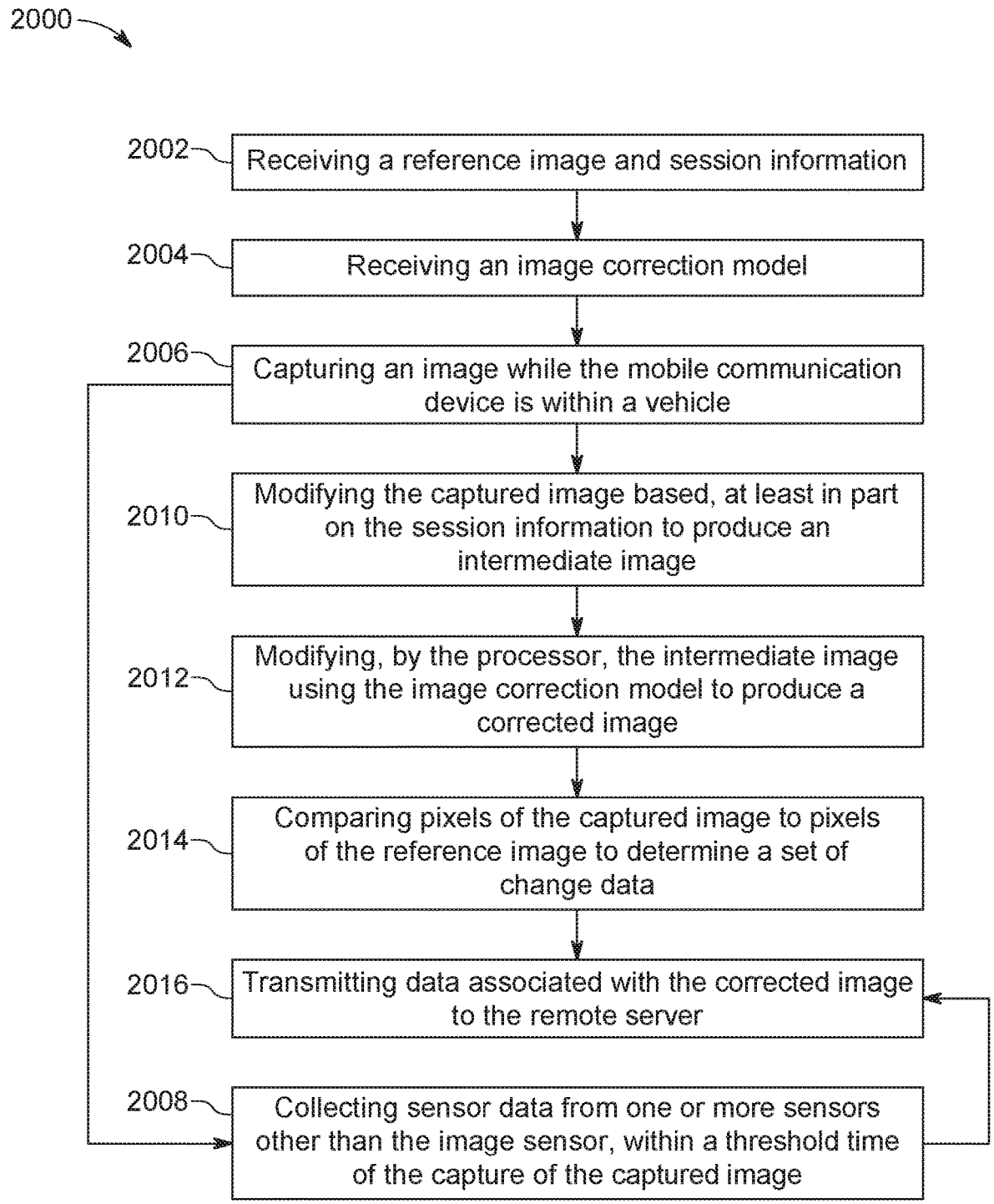
FIG. 20 shows a process flow diagram of an exemplary method for image correction and orthorectification in accordance with some embodiments.

FIG. 20 shows a process flow diagram of an exemplary method for image correction and orthorectification in accordance with various embodiments. With reference to FIGS. 1-20, the method 2000 illustrates techniques for implementing image correction and orthorectifcation on a mobile communication device 102.

In block 2002, the mobile communication device 102 may receive from the remote server, a reference image and session information, wherein the session information includes metadata from a capture session of the reference image. That is, the communication interface 320 may receive from the remote server 110, a reference image and session information for an assigned task. The session information may include metadata relating to the location of the target location shown in the reference image, as well as information about the capture session of the reference image. In block 2004, the transceiver of the mobile communication device 102 may receive an image correction model. This may occur in essentially the same manner as that discussed with reference to block 1906 of FIG. 19.

In block 2006, the image sensor 328 of the mobile communication device 102 may capture an image while the mobile communication device 102 is within a vehicle 104. This may occur in essentially the same manner as that discussed with reference to block 908 of FIG. 9 or 1906 of FIG. 19.

In block 1910, the mobile communication device 102 may modify the captured image based, at least in part on the session information to produce an intermediate image. That is, the image processing module 314 may orthorectify the captured image such that the perspective of the captured image more closely matches the perspective of the reference image. This may include adjusting for the roll, tilt, pitch, and yaw of the image sensor that captured the reference image.

In block 912, the mobile communication device 102, may modify the intermediate image using the image correction model to produce a corrected image. That is, the image processing module 314 may apply the image correction model received form the remote server 110. The image correction model may adjust the intermediate image to account for reference image sensor settings and capabilities, weather, speed of the vehicle, lighting, time of day, etc.

In block 2014, the mobile communication device 102 may compare pixels of the captured image to pixels of the reference image to determine a set of change data, wherein the change data represents differences between the pixels of the reference image and the pixels of the captured image. That is, image processing module 314 or task handler module 312 may perform a comparison between the reference image and the modified image to determine the set of change data representing differences between the two images. In block 1918, the transceiver of the mobile communication device 102 may transmit data associated with the corrected image to the remote server. This may occur in essentially the same manner as is described with reference to block 910 of FIG. 9, In block 2008, the mobile communication device 102 may collect sensor data from one or more sensors 330 other than the image sensor 326, within a threshold time of the capture of the captured image. That is, the processor 326 may collect sensor data from sensor 330 through regular polling. The sensor data collected during and near the image capture session may be transmitted via the communication interface 322 to the remote server 100. The one or more sensors may include one or more of: a barometer, an accelerometer, or a gyroscope.

VI. In-Transit Power Management

While users are in-transit, they may not have ready access to power sources such as wall outlets and batteries. Entertainment applications running on mobile communication device 102 may consume large amounts of power and may make it difficult for users to complete image capture tasks. Power resource management by the crowdsourcing application 310 may reduce the impact of power hungry applications on the ability of users to complete image capture tasks.

To account for instances, in which a mobile communication device 102 may not be completely charged the crowdsourcing application 310 may monitor the mobile communication device 102 battery level to optimize GPS and other sensor polling. In situations in which a mobile communication device 102 battery may not have a full charge, power consumption may be reduced at the expense of fine-grain spatial awareness. To work around this limitation, the mobile communication device 102 may compare its current position coordinates to the next target location coordinates to calculate time-to-arrival using a current speed. Speed information is compared to ADSB data for quality control. Once the time is calculated, sensor polling frequency may be reduced or halted until the target location is reached. The process may be reversed, at which point the GPS is re-polled and the current coordinates are compared against the target for accuracy.

Figure 21:
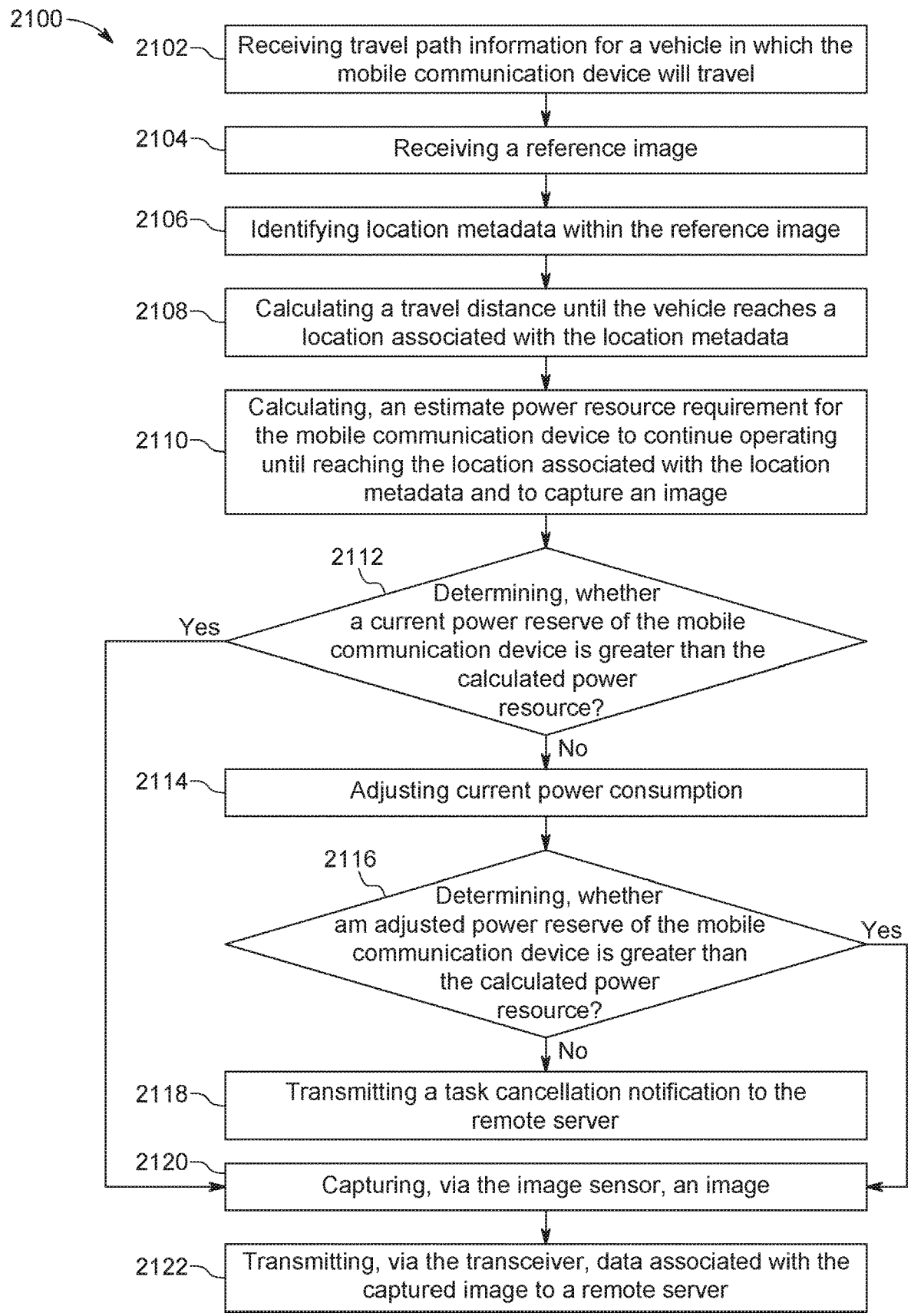
FIG. 21 shows a process flow diagram of an exemplary method for power resource management in a mobile communication device of a crowdsourced surveillance system accordance with some embodiments.

FIG. 21 shows a process flow diagram of an exemplary method for power resource management in a mobile communication device of a crowdsourced surveillance system accordance with some embodiments. With reference to FIGS. 1-21, the method 2100 may be implemented by a mobile communication device 102 in a crowdsourced surveillance platform, in order to conserve in-transit power resources.

In block 2102, the transceiver of the mobile communication device 102 may receive from a remote server, travel path information for a vehicle 104 in which the mobile communication device 102 will travel. That is, the communication interface 322 of the mobile communication device 102 may receive an estimated travel path from the remote server 110. Alternatively, the estimated travel path may be provided by a substitute travel information source. In block 2104, the transceiver may receive a reference image. This may occur in essentially the same manner as described with reference to block 902 of FIG. 9.

In block 2106, the mobile communication device 102 may identify location metadata within the reference image. This may occur in essentially the same manner as is described with reference to block 904 of FIG. 9.

In block 2108, the mobile communication device 102 may calculate a travel distance until the vehicle 104 reaches a location associated with the location metadata. That is, the processor 326 may determine the distance between a current position of the mobile communication device 102 and the target location, and a point at which the mobile communication device 102 will be in image capture range of the target location. The speed of the vehicle 104 may be used in combination with the distance to determine a time-to-arrival.

In block 2110 the mobile communication device 102 may calculate an estimate power resource requirement for the mobile communication device 12 to continue operating until reaching the location associated with the location metadata and to capture an image. That is, the processor 326 may calculate the amount of power resources needed to make it to the target location and capture an image of the target location. Alternatively, the processor 326 may calculate the amount of power resources needed to continue operating until reaching a point at which the mobile communication device 102 is within image capture range of the target location, and to also capture an image of the target location. The required power resources may be the amount of power needed to continue operations for the extent of the time-to-arrival.

In block 2112, the mobile communication device 102 may determine whether a current power reserve of the mobile communication device is greater than or equal to the calculated power resource. That is, the processor 326 may evaluate the remaining power reserve in a battery of the mobile communication device 102. If the current power reserve is not greater than the calculated power resource, then the mobile communication device 102 may, in block 1214, adjust current power consumption by the mobile communication device in response to determining that current the power reserve is less than the power resource requirement. Adjusting or disabling power consumption may include reducing polling by GPS transceivers, and sensors 330.

In block 2116, the mobile communication device 102 may determine whether an adjusted power consumption is greater than the calculated power resource. That is, the processor 326 may evaluate whether the adjusted power consumption is sufficient to enable completion of the image capture task. If the adjusted power consumption is still not sufficient, then in block 1918, the transceiver may transmit a task cancellation message to the remote server 110. That is, the communication interface 322 may transmit a task cancellation message informing the remote server 110 that the mobile communication device 102 will not be able to complete the task assigned in association with the target location.

If the answer to either block 2112 or 2116 is "yes," the power reserve is greater than the calculated power then in block 2120, the image sensor 326 of the mobile communication device 102 may capture an image of the target location. This may occur in essentially the same manner as is described with reference to block 908 of FIG. 9. In block 2122, the transceiver of the mobile communication device 102 may transmit the captured image to the remote server 110. The may occur in essentially the same manner as is described with reference to block 910 of FIG. 9.

VII. Image Aggregation

The crowdsourcing surveillance platform may collect and aggregate data from captured images in order to generate a record of changes over time at target location. The change data collected from numerous mobile communication devices 102A, 102B, and 102C may be used to update a map and create a log of changes over time. These changes over time may be used by clients to track and or monitor changes to target locations. Images may be updated on a rolling basis as new change data is received. The remote server 110 may increase or decrease task assignments for a target location in order to modify the frequency of revisitation for a target location, thereby providing significant control over the granularity of surveillance periods.

Figure 22:
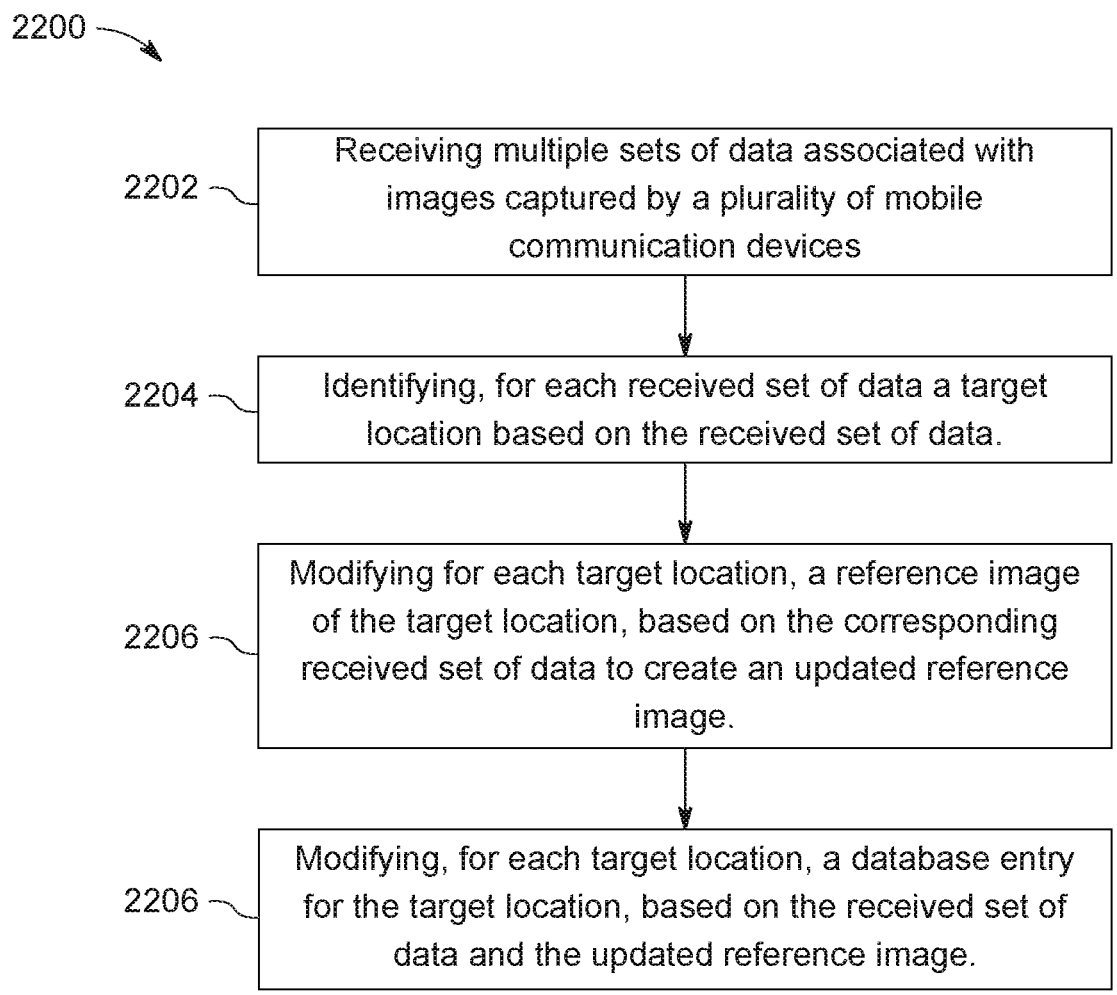
FIG. 22 shows a process flow diagram of an exemplary method for updating images of target locations based on crowdsourced images In accordance with some embodiments.

FIG. 22 shows a process flow diagram of an exemplary method for updating images of target locations based on crowdsourced images In accordance with some embodiments. With reference to FIGS. 1-22, the method 2200 may enable the collection and aggregation of captured surveillance images. Various mobile communication devices 102A, 102B, and 102C may transmit change data for captured images to the remote server 110 for aggregation.

In block 2202, the remote server 110 may receive multiple sets of data associated with images captured by a plurality of mobile communication devices 102A, 102B, and 102C. That is, the communication interface 520 may receive numerous sets of change data associated with captured image for target locations. Each set of change data may be associated with a task assigned to a mobile communication device 102.

In block 2204, the remote server may identify for each received set of data a target location based on the received set of data. That is, the task handler module 512 may match the received change data with an assigned task, such as aby a task identifier transmitted with the change data. The task handler module 512 may use the task identifier to identify the target location associated with the task. In this way, the change data can be matched to a target location and update the reference image for the target location. Similarly, the change data may be used in creating a log of changes to the target location over time.

In block 2206, the remote server 110 may modify for each target location, a reference image of the target location, based on the corresponding received set of data to create an updated reference image. That is, the mapping module 514 may compare the change data to the reference image, the combination of which may recreate the captured image. The change data may be thought of as a mask applied to the reference image to create the captured image.

In block 2208, the remote server 110 may modify for each target location, a database entry for the target location, based on the received set of data and the updated reference image. That is, the mapping module 516 may update a database containing information about the target location to include the updated reference information and session information. Thus the captured images may replace the reference images, and current session information may replace the reference image session information. This updated reference image and session information may now be provided to the next mobile communication device 102 that is assigned a capture task for the target location.

Figure 23:
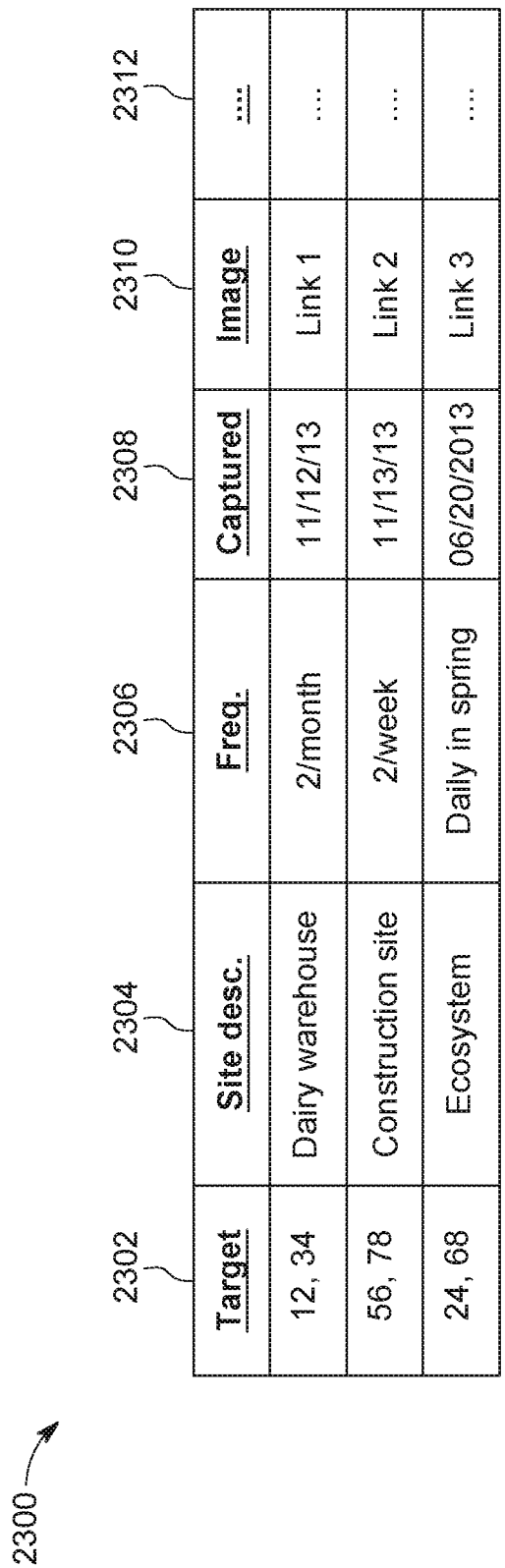
FIG. 23 shows a block diagram of an exemplary data structure for maintaining crowdsourced surveillance information In accordance with some embodiments.

FIG. 23 shows a block diagram of an exemplary data structure for maintaining crowdsourced surveillance information In accordance with some embodiments. With reference to FIGS. 1-23, a set of database entries 2300 for the remote server 110 may include a variety of information about tasks and target locations. An exemplary database for task tracking may enable the crowdsourced surveillance platform to track progression of task completion. Column 2302 includes target location coordinates, in which each cell includes grid coordinates or a pin coordinate for the target location. Column 2304 may provide a simple site description for the target location. Column 2306 indicates the frequency of revisitation. This frequency rate may be requested by a client or established by the remote server 110 based on guidelines. The remote server 110 task handler module 512 may assign tasks on a basis consistent with the frequency of the revisitation. That is, the task handler module 512 may calculate the actual revisitation rate based on the travel journeys of users, and may increase the number of tasks assigned, or decrease the number of tasks, to more closely match the frequency indicated in the database. In column 2308, the data of capture for the reference image is stored. A link to the location in memory 502 of the reference image may be listed in column 2310. Associated session information for the reference image may be linked in column 2312. This may be a link to a location in memory 502 which may include the database. Each time a task is assigned, these fields may be used to retrieve the reference image and session information for a target location associated with the task.

The above description is illustrative and is not restrictive. Many variations of the invention will become apparent to those skilled in the art upon review of the disclosure.

The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A mobile communication device for performing sensor analysis in a crowd-sourced surveillance comprising:
   a processor;
   a transceiver controlled by the processor;
   a sensor connected to the transceiver;
   a memory in communication with the processor, the memory having stored thereon processor-executable instructions that when executed cause the processor to perform operations comprising;
   receiving a sensor status request identifying a sensor for which status is requested;
   polling the sensor to obtain a sensor status;
   determining, based on the sensor status, whether the sensor is inadequate for capturing data associated with an in-transit image capture;
   in response to the determining that the sensor status is inadequate, transmitting to the remote server a sensor status reply indicating that the sensor status is inadequate; and
   receiving substitute vehicle movement data, wherein the substitute vehicle movement data includes data about the movement of a vehicle hosting the mobile communication device.

2. The mobile communication device of claim 1, further comprising instructions for performing the operations:
   initiating, via the image sensor, capture of an image, based at least in part on the substitute vehicle movement data.

3. The mobile communication device of claim 1, further comprising instructions for performing the operations:
   in response to determining that the sensor status is adequate, collecting, from the sensor, sensor data at intervals during travel of the vehicle, in which the mobile communication device is located.

4. The mobile communication device of claim 3, further comprising instructions for performing the operations: initiating, via the image sensor, capture of an image, based at least in part on the sensor data.

5. The mobile communication device of claim 1, wherein determining, based on the sensor status, whether the sensor is inadequate for capturing data associated with an in-transit image capture comprises:
   determining, by the processor, whether the sensor is installed on the mobile communication device, based, at least in part on system data stored in the memory.

6. The mobile communication device of claim 1, wherein determining, based on the sensor status, whether the sensor is inadequate for capturing data associated with an in-transit image capture comprises:
   determining, by the processor, whether the sensor is fully functioning.

7. The mobile communication device of claim 1, wherein the sensor status request includes a list of sensors for which status is desired.

8. The mobile communication device of claim 1, wherein the substitute vehicle movement data includes one or more of altitude, speed, depth, direction, or air pressure.

9. A method for performing sensor analysis in a crowd-sourced surveillance comprising:
   receiving, by a transceiver of a mobile communication device, from a remote server, a sensor status request identifying a sensor for which status is requested;
   polling the sensor to obtain a sensor status;
   determining, based on the sensor status, whether the sensor is inadequate for capturing data associated with an in-transit image capture;
   in response to the determining that the sensor status is inadequate, transmitting to the remote server a sensor status reply indicating that the sensor status is inadequate; and
   receiving, from the remote server, substitute vehicle movement data, wherein the substitute vehicle movement data comprises data about the movement of a vehicle hosting the mobile communication device.

10. The method of claim 9, further comprising:
    initiating, via an image sensor of the mobile communication device, capture of an image, based at least in part on the substitute vehicle movement data.

11. The method of claim 9, further comprising:
    in response to determining that the sensor status is adequate, collecting, from the sensor, sensor data at intervals during travel of the vehicle, in which the mobile communication device is located.

12. The method of claim 11, further comprising:
    initiating, via the image sensor, capture of an image, based at least in part on the sensor data.

13. The method of claim 9, wherein determining, based on the sensor status whether the sensor is inadequate for capturing data associated with an in-transit image capture comprises:
    determining, by the processor, whether the sensor is installed on the mobile communication device, based, at least in part on system data stored in the memory.

14. The method of claim 9, wherein determining, based on the sensor status whether the sensor is inadequate for capturing data associated with an in-transit image capture comprises:
    determining, by the processor, whether the sensor is fully functioning.

15. The method of claim 9, wherein the sensor status request includes a list of sensors for which status is desired.

16. The method of claim 9, wherein the substitute vehicle movement data includes one or more of altitude, speed, depth, direction, or air pressure.

17. A non-transitory computer-readable medium having stored thereon processor-executable instructions for crowd-sourcing surveillance by performing operations comprising:
    receiving, from a remote server, a sensor status request identifying a sensor for which status is requested;
    polling the sensor to obtain a sensor status;
    determining, based on the sensor status, whether the sensor is inadequate for capturing data associated with an in-transit image capture;
    in response to the determining that the sensor status is inadequate, transmitting to the remote server a sensor status reply indicating that the sensor status is inadequate; and
    receiving, from the remote server, substitute vehicle movement data, wherein the substitute vehicle movement data comprises data about the movement of a vehicle hosting the mobile communication device.

18. The non-transitory computer-readable medium of claim 17, further comprising instructions for performing the operations:
    initiating, via an image sensor of the mobile communication device, capture of an image, based at least in part on the substitute vehicle movement data.

19. The non-transitory computer-readable medium of claim 17, wherein determining, based on the sensor status whether the sensor is inadequate for capturing data associated with an in-transit image capture comprises:
    determining, by the processor, whether the sensor is installed on the mobile communication device, based, at least in part on system data stored in the memory.

20. The non-transitory computer-readable medium of claim 17, wherein determining, based on the sensor status whether the sensor is inadequate for capturing data associated with an in-transit image capture comprises:
    determining, by the processor, whether the sensor is fully functioning.

* * * * *